(12) United States Patent
Huang et al.

(10) Patent No.: US 12,198,877 B2
(45) Date of Patent: Jan. 14, 2025

(54) BACKLIGHT MODULE AND LIGHTING BOARD FOR LIGHTING KEYBOARD

(71) Applicant: DARFON ELECTRONICS CORP., Taoyuan (TW)

(72) Inventors: Heng-Yi Huang, Taoyuan (TW); Hsin-Cheng Ho, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 18/512,073

(22) Filed: Nov. 17, 2023

(65) Prior Publication Data

US 2024/0096568 A1    Mar. 21, 2024

Related U.S. Application Data

(63) Continuation of application No. 18/353,925, filed on Jul. 18, 2023, now Pat. No. 12,062,506, and a
(Continued)

(30) Foreign Application Priority Data

Jan. 5, 2021    (TW) .................................. 110100264
Apr. 23, 2021   (CN) ......................... 202110441985.1
(Continued)

(51) Int. Cl.
*H01H 13/83*    (2006.01)
*F21V 8/00*     (2006.01)
(Continued)

(52) U.S. Cl.
CPC ........... *H01H 13/83* (2013.01); *G02B 6/0055* (2013.01); *H01H 13/023* (2013.01); *H01H 13/705* (2013.01); *H01H 3/125* (2013.01)

(58) Field of Classification Search
CPC .... H01H 13/83; H01H 13/023; H01H 13/705; H01H 3/125; H01H 2211/004;
(Continued)

(56) References Cited

U.S. PATENT DOCUMENTS 2,953,668 A    9/1960  Bassett, Jr.
3,103,659 A    9/1963  Edwards
(Continued)

FOREIGN PATENT DOCUMENTS

CN    101514801 A    8/2009
CN    201758091 U    3/2011
(Continued)

OTHER PUBLICATIONS

Chen, the specification, including the claims, and drawings in the U.S. Appl. No. 18/369,217, filed Sep. 18, 2023.
(Continued)

*Primary Examiner* — Lheiren Mae A Caroc
(74) *Attorney, Agent, or Firm* — Winston Hsu

(57) ABSTRACT

A backlight module configured to illuminate at least one key cap of a lighting keyboard. The backlight module includes a lighting board, a light emitting unit and a light guide plate. The lighting board has a first reflective layer, a lighting circuit and two aligned micro-structure regions, all three at least partially being layered in parallel with each other. The two micro-structure regions reflect lights and are separated by the lighting circuit. The light emitting unit includes plural color dies connecting electrically with the lighting circuit. The light guide plate has a light guide hole for accommodating the light emitting unit. The color dies of the light emitting unit are aligned linearly, while the two micro-structure regions of the lighting board are aligned in per-
(Continued)

pendicular to the linearly-aligned color dies, with the microstructure regions disposed at opposite sides the light emitting unit.

20 Claims, 19 Drawing Sheets

Related U.S. Application Data continuation of application No. 18/297,020, filed on Apr. 7, 2023, now Pat. No. 11,881,363, which is a continuation-in-part of application No. 18/127,667, filed on Mar. 29, 2023, now abandoned, said application No. 18/353,925 is a continuation of application No. 17/847,853, filed on Jun. 23, 2022, now Pat. No. 11,728,110, which is a continuation-in-part of application No. 17/234,808, filed on Apr. 20, 2021, now Pat. No. 11,764,004.

(60) Provisional application No. 63/438,254, filed on Jan. 11, 2023, provisional application No. 63/430,675, filed on Dec. 7, 2022, provisional application No. 63/378,261, filed on Oct. 4, 2022, provisional application No. 63/368,272, filed on Jul. 13, 2022, provisional application No. 63/325,623, filed on Mar. 31, 2022.

(30) Foreign Application Priority Data

| | | |
|---|---|---|
| Apr. 8, 2022 | (TW) | 111113486 |
| Mar. 9, 2023 | (TW) | 112108658 |
| Mar. 20, 2023 | (TW) | 122110265 |
| Mar. 28, 2023 | (TW) | 112111749 |

(51) Int. Cl.
*H01H 13/02* (2006.01)
*H01H 13/705* (2006.01)
*H01H 3/12* (2006.01)

(58) Field of Classification Search
CPC ......... H01H 2219/056; H01H 2219/06; H01H 2219/062; H01H 2219/066; H01H 13/02; H01H 3/12; G02B 6/0055; G02B 6/0021; G02B 6/0068; F21V 8/00
See application file for complete search history.

(56) References Cited

U.S. PATENT DOCUMENTS

| | | | |
|---|---|---|---|
| 3,157,771 | A | 11/1964 | Roeser |
| 3,467,802 | A | 9/1969 | Martin |
| 3,639,745 | A | 2/1972 | Shiki |
| 4,346,275 | A | 8/1982 | Iwakiri |
| 4,535,396 | A | 8/1985 | Guthrie |
| 4,722,028 | A | 1/1988 | Brannon |
| 5,150,257 | A | 9/1992 | Mohabbatizadeh |
| 5,434,377 | A | 7/1995 | Martin |
| 6,210,010 | B1 | 4/2001 | Pontetti |
| 6,558,013 | B2 | 5/2003 | Tholin |
| 6,743,993 | B1 | 6/2004 | Clark |
| 9,040,856 | B2 | 5/2015 | Chen |
| 9,214,301 | B2 | 12/2015 | Chen |
| 9,299,515 | B2 | 3/2016 | Chen |
| 10,276,327 | B2 | 4/2019 | Chen |
| 10,586,664 | B2 | 3/2020 | Yeh |
| 11,036,306 | B2 | 6/2021 | Cheng |
| 11,170,950 | B2 | 11/2021 | Liang |
| 11,257,638 | B2 | 2/2022 | Liang |
| 11,371,676 | B2 | 6/2022 | Huang |
| 11,409,373 | B2 | 8/2022 | Cheng |
| 11,443,907 | B2 | 9/2022 | Ho |
| 11,515,107 | B2 | 11/2022 | Chen |
| 11,538,641 | B2 | 12/2022 | Liang |
| 11,914,185 | B1 * | 2/2024 | Chen ...................... H01H 13/14 |
| 2009/0140891 | A1 | 6/2009 | Ragusa |
| 2011/0037730 | A1 | 2/2011 | Wang |
| 2012/0275193 | A1 | 11/2012 | Yoshida |
| 2014/0166457 | A1 | 6/2014 | Chen |
| 2015/0212254 | A1 | 7/2015 | Sun |
| 2017/0352504 | A1 | 12/2017 | Chen |
| 2019/0027326 | A1 | 1/2019 | Tsai |
| 2019/0369744 | A1 | 12/2019 | Wu |
| 2019/0371538 | A1 | 12/2019 | Huang |
| 2020/0043681 | A1 | 2/2020 | Chen |
| 2020/0402748 | A1 | 12/2020 | Cheng |
| 2022/0406977 | A1 | 12/2022 | Ho |
| 2023/0047235 | A1 | 2/2023 | Chen |
| 2023/0305214 | A1 | 9/2023 | Chen |
| 2023/0314691 | A1 | 10/2023 | Liu |
| 2023/0317386 | A1 | 10/2023 | Huang |
| 2023/0317387 | A1 | 10/2023 | Huang |
| 2023/0377816 | A1 | 11/2023 | Liu |
| 2023/0420199 | A1 * | 12/2023 | Liu ...................... G02B 6/0021 |
| 2024/0118480 | A1 * | 4/2024 | Chen ...................... H01H 13/023 |
| 2024/0230982 | A9 * | 7/2024 | Chen ...................... H01H 13/023 |

FOREIGN PATENT DOCUMENTS

| | | |
|---|---|---|
| CN | 203377146 U | 1/2014 |
| CN | 104252987 A | 12/2014 |
| CN | 106301323 A | 1/2017 |
| CN | 106783308 A | 5/2017 |
| CN | 110335775 A | 10/2019 |
| CN | 110880456 A | 3/2020 |
| CN | 214310968 U | 9/2021 |
| CN | 113632249 A | 11/2021 |
| JP | 2019-139728 | 8/2019 |
| TW | I269993 | 1/2007 |
| TW | M321552 | 11/2007 |
| TW | M334393 | 6/2008 |
| TW | 200945114 | 11/2009 |
| TW | M395202 U1 | 12/2010 |
| TW | I416565 B | 11/2013 |
| TW | 201419343 A | 5/2014 |
| TW | I494960 B | 8/2015 |
| TW | I527075 B | 3/2016 |
| TW | M548881 U | 9/2017 |
| TW | I604484 B | 11/2017 |
| TW | 201824318 A | 7/2018 |
| TW | I632577 B | 8/2018 |
| TW | I725894 | 4/2021 |
| TW | 202143270 A | 11/2021 |
| TW | 202211277 A | 3/2022 |
| TW | I760181 B | 4/2022 |

OTHER PUBLICATIONS

Chen, the specification, including the claims, and drawings in the U.S. Appl. No. 18/368,538, filed Sep. 14, 2023.
Chen, the specification, including the claims, and drawings in the U.S. Appl. No. 18/376,818, filed Oct. 4, 2023.

* cited by examiner

BACKLIGHT MODULE AND LIGHTING BOARD FOR LIGHTING KEYBOARD

CROSS REFERENCE TO RELATED APPLICATIONS

This application is a continuation-in-part of U.S. application Ser. No. 18/353,925, filed on Jul. 18, 2023, which is a continuation of U.S. application Ser. No. 17/847,853, filed on Jun. 23, 2022, which was a continuation-in-part application of and claimed the priority benefit of U.S. application Ser. No. 17/234,808, filed on Apr. 20, 2021, which claimed the priority benefit of Taiwan patent application No. 110100264, filed on Jan. 5, 2021, and also claimed the priority benefit of China Patent application No. 202110441985.1, filed on Apr. 23, 2021 and U.S. application Ser. No. 63/325,623, filed on Mar. 31, 2022. This application is also a continuation-in-part of U.S. application Ser. No. 18/367,420, filed on Sep. 12, 2023, which is a continuation-in-part of U.S. application Ser. No. 18/297,020, filed on Apr. 7, 2023, which claims the benefit of U.S. Provisional Application No. 63/430,675, filed on Dec. 7, 2022, and claims the benefit of U.S. Provisional Application No. 63/438,254, filed on Jan. 11, 2023, and claims the benefit of U.S. Provisional Application No. 63/368,272, filed on Jul. 13, 2022, and is a continuation-in-part of U.S. application Ser. No. 18/127,667, filed on Mar. 29, 2023, which claims the benefit of U.S. Provisional Application No. 63/325,623, filed on Mar. 31, 2022, and claims the benefit of U.S. Provisional Application No. 63/430,675, filed on Dec. 7, 2022, and claims the benefit of U.S. Provisional Application No. 63/378,261, filed on Oct. 4, 2022. The contents of these applications are incorporated herein by reference.

BACKGROUND OF THE INVENTION

1. Field of the Invention

The invention relates to a backlight module and a lighting board for a colorful lighting keyboard and, more particularly, to a lighting keyboard and a backlight module capable of enhancing the overall color-mixing illuminating consistency for a lighting board.

2. Description of the Prior Art

As technology advances, there are many types of keyboards in use. Users pay much more attention to visual effect of keyboard except basic input function while choosing keyboard. So far a lighting keyboard has been developed. The lighting keyboard attracts users in visual effect and can be used in darkness. Since the lighting keyboard of the prior art applies a low luminous light emitting diode (LED) to illuminate each of square keyswitches, the following problems may occur: 1) the main symbol above the LED is over-illuminated and the corner symbol(s) of keycap is too dark; 2) the surrounding outlet for keycap peripheral is inconsistent; and 3) the overall illuminating consistency on a single square keyswitch and on plural keyswitches are both not good.

SUMMARY OF THE INVENTION

The invention provides a lighting keyboard, a backlight module and a lighting board capable of enhancing the overall illuminating consistency, so as to solve the aforesaid problems.

According to an embodiment, the invention provides a backlight module configured to illuminate at least one key cap. The backlight module comprises a lighting board, a light emitting unit and a light guide plate. The lighting board has a first reflective layer, a lighting circuit and a plurality of conductive pads layered at least partially in parallel to each other. The light emitting unit includes a plurality of color dies connecting electrically with the lighting circuit through the plurality of pads. The light guide plate operates as a light-permeable spacer, and has a light guide hole for accommodating the light emitting unit. At least one of the first reflective layer, the lighting circuit and the plurality of conductive pads are partially exposed within the light guide hole to reflect different color lights directly or indirectly from the plurality of color dies to enter the light guide plate for lateral transmission and color-mixing. A light-permeable adhesive layer is disposed outside the light guide hole and further spaced outwards by a non-adhesive clearance area circling between the light guide hole and the adhesive layer.

According to another embodiment, the lighting board further comprises a plurality of micro-structure regions separated by the lighting circuit, and the non-adhesive clearance area and the adhesive layer being jointly surrounded by the plurality of micro-structure regions. In another embodiment, the lighting circuit has a pair of non-intersecting traces, and the color dies of the light emitting unit are linearly aligned perpendicular to the pair of non-intersecting traces. In another embodiment, each of the color dies of the light emitting unit comprises two opposite short sides, and all the color dies are consecutively aligned with any adjacent two of said short sides being arranged one facing another. In another embodiment, the backlight module further comprises a shielding sheet, and the shielding sheet comprises an inner reflective section overlapping with at least one of the first reflective layer, the lighting circuit and the plurality of conductive pads partially exposed within the light guide hole. In another embodiment, a protrusion structure is formed on the lighting board and corresponds to the light emitting unit. In another embodiment, the backlight module further comprises a shielding sheet disposed above the light emitting unit, wherein a protrusion structure is formed on the shielding sheet and corresponds to the light emitting unit.

According to another embodiment, the invention provides a backlight module configured to illuminate at least one key cap. The backlight module comprises a lighting board, a light emitting unit and a light guide plate. The lighting board has a first reflective layer, a lighting circuit and two aligned micro-structure regions, all three at least partially being layered in parallel with each other. The two micro-structure regions reflect lights and are separated by the lighting circuit. The light emitting unit includes plural color dies connecting electrically with the lighting circuit. The light guide plate has a light guide hole for accommodating the light emitting unit. The color dies of the light emitting unit are aligned linearly, while the two micro-structure regions of the lighting board are aligned in perpendicular to the linearly-aligned color dies, with the micro-structure regions disposed at opposite sides the light emitting unit.

According to another embodiment, the lighting circuit has two non-intersecting sub-traces electrically connected to the light emitting unit, and the two sub-traces separating the two micro-structure regions. In another embodiment, the lighting circuit has two non-intersecting main traces electrically connected to the light emitting unit through the two sub-traces, and the two inner micro-structure regions of the at least two micro-structure regions being disposed between the two main traces. In another embodiment, the lighting circuit has two non-intersecting main traces electrically connected to the light emitting unit, the pair of micro-structure regions being disposed outside the two main traces. In another embodiment, a protrusion structure is formed on the lighting board and corresponds to the light emitting unit. In another embodiment, the backlight module further comprises a shielding sheet disposed above the light emitting unit, wherein a protrusion structure is formed on the shielding sheet and corresponds to the light emitting unit. In another embodiment, each of the color dies of the light emitting unit comprises two opposite short sides, and all the color dies are consecutively aligned with any adjacent two of said short sides being arranged one facing another.

According to another embodiment, the invention provides a lighting board configured to illuminate at least one key cap. The lighting board comprises a lighting circuit, at least two micro-structure regions, and a light emitting unit. The lighting circuit is at least partially reflective and includes at least two non-intersecting traces and a plurality of conductive pads. The at least two micro-structure regions are separated from each other by the lighting circuit; each of the at least two micro-structure regions reflects lights. The light emitting unit is located between the two micro-structure regions; the light emitting unit includes a plurality of color dies providing different color lights and electrically connecting with the two non-intersecting traces through the plurality of pads. The color dies of the light emitting unit are aligned linearly, while the two micro-structure regions are aligned in perpendicular to the linearly-aligned color dies, with the micro-structure regions disposed at opposite sides the light emitting unit.

According to another embodiment, In another embodiment, the lighting board further comprises a protrusion formed corresponding to the light emitting unit. In another embodiment, the lighting circuit has two non-intersecting sub-traces electrically connected to the light emitting unit, and the two sub-traces separating two inner micro-structure regions of the at least two micro-structure regions. In another embodiment, the lighting circuit has two non-intersecting main traces electrically connected to the light emitting unit through the two sub-traces, and the two inner micro-structure regions of the at least two micro-structure regions being disposed between the two main traces. In another embodiment, the lighting circuit has two non-intersecting main traces electrically connected to the light emitting unit, and two outer micro-structure regions of the at least two micro-structure regions being disposed outside the two main traces. In another embodiment, each of the color dies of the light emitting unit comprises two opposite short sides, and all the color dies are consecutively aligned with any adjacent two of all said short sides being arranged one facing another.

As mentioned in the above, the invention forms a protruding structure between the two non-intersecting traces or the plurality of micro-structure regions, and the position of the protruding structure corresponds to the position of the light emitting unit. Accordingly, the amount of light emitted by the light emitting unit entering the light guide panel can be increased and the micro-structure regions specifically arranged on the lighting board can be used to recycle light or assist light output, so as to enhance the overall illuminating consistency. By implementing the optimized structure of the backlight module and lighting board, the color mixing effects from different lights of the color dies of the light emitting unit, transmitting through the light guide plate and to key caps of a lighting keyboard, will be majorly enhanced.

Furthermore, the embodiments of the invention simultaneously solve the problem of connection stability of the light emitting unit and the problem of excessive concentration of light emitted from adjacent areas of the light emitting unit. In addition to using the pads with the hollow areas to ensure that the light emitting unit can still be connected well when the light emitting unit is offset during mounting process, the pads and the hollow areas thereof are further used together with the first reflective layer to form a light uniform design in the first area. Furthermore, combined with the inner micro-structure regions of the lighting board in the second area and the adhesive layer and the non-adhesive area in the third area, the invention provides different light uniform schemes for different blocks along the outward optical path of the light emitting unit, such that a high degree of uniformity can be achieved in a single key and the entire keyboard.

These and other objectives of the present invention will no doubt become obvious to those of ordinary skill in the art after reading the following detailed description of the preferred embodiment that is illustrated in the various figures and drawings.

DETAILED DESCRIPTION

A low power light emitting unit, such as mini LED or micro LED, may be used to reduce power consumption, reduce total heat generated by a backlight module, and reduce the overall thickness of the backlight module, such that it is beneficial to further make a lighting keyboard thinner. However, the highly limited luminous range of mini LED or micro LED causes a great challenge to the luminous uniformity of a single keyswitch and the entire lighting keyboard. The embodiments of the invention first focus on how to make a large proportion of light from the light emitting unit enter a light guide panel for lateral transmission, and how to effectively recycle the light that passes through the light guide panel during the lateral transmission into the light guide panel for reuse.

Figure 1:
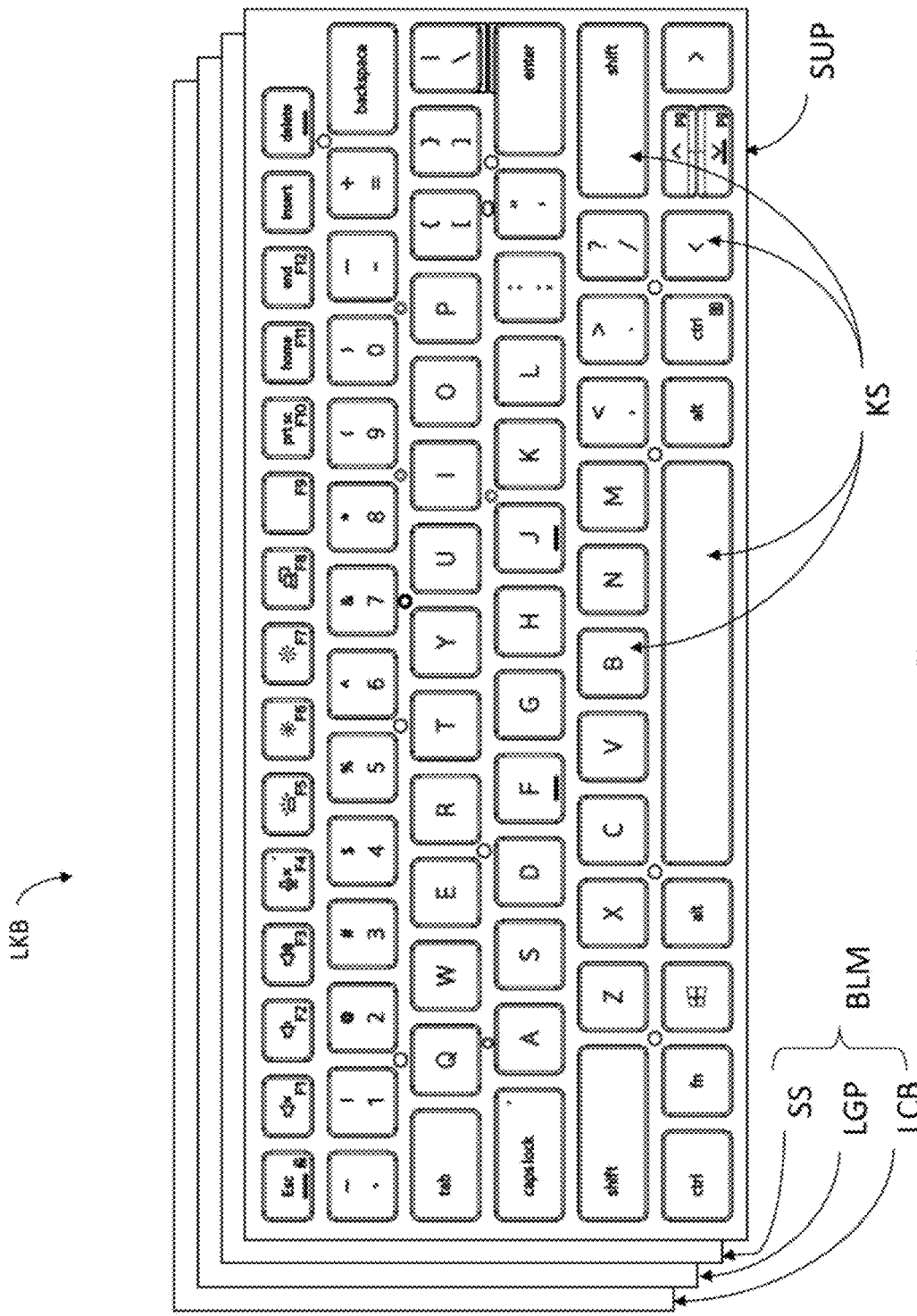
FIG. 1 is a schematic view illustrating a lighting keyboard according to an embodiment of the invention.

Referring to FIG. 1, FIG. 1 is a schematic view illustrating a lighting keyboard LKB according to an embodiment of the invention.

As shown in FIG. 1, the lighting keyboard LKB comprises a backlight module BLM and a plurality of keyswitches KS. A support plate SUP is disposed on the backlight module BLM and the keyswitches KS are disposed on the support plate SUP. In general, the keyswitches KS may comprise square keys and multiple keys (e.g. space key). It should be noted that the number, size and arrangement of the keyswitches KS may be determined according to practical applications, so the invention is not limited to the embodiment shown in the figure.

The backlight module BLM comprises a lighting board LCB, a light guide panel LGP and a shielding sheet SS. The light guide panel LGP is disposed on the lighting board LCB and the shielding sheet SS is disposed on the light guide panel LGP. Each keyswitch KS on the lighting keyboard LKB corresponds to at least one light emitting unit (e.g. LED) on the lighting board LCB of the backlight module BLM.

Figure 2:
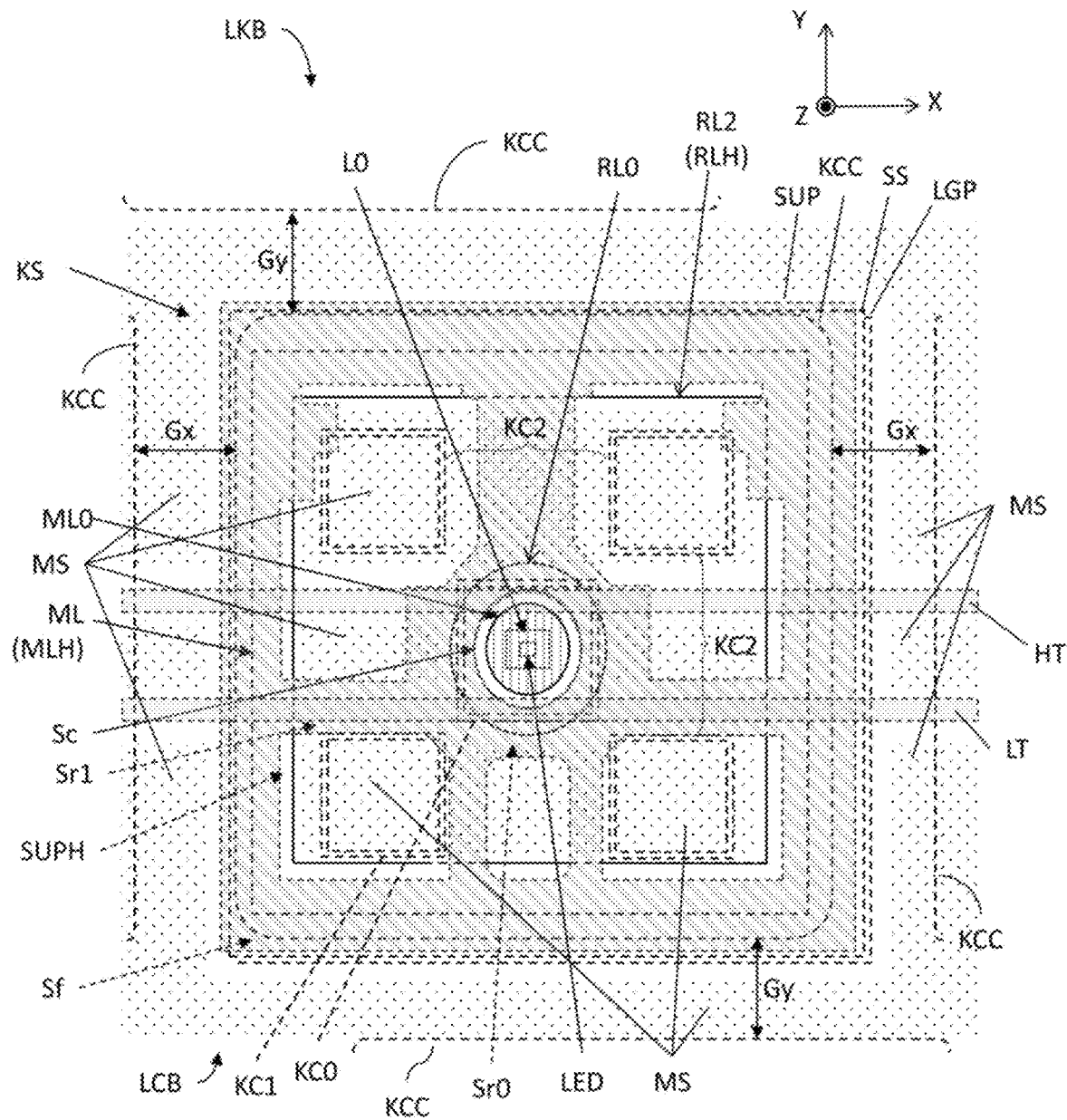
FIG. 2 is a partial top view illustrating the lighting keyboard shown in FIG. 1.
Figure 3:
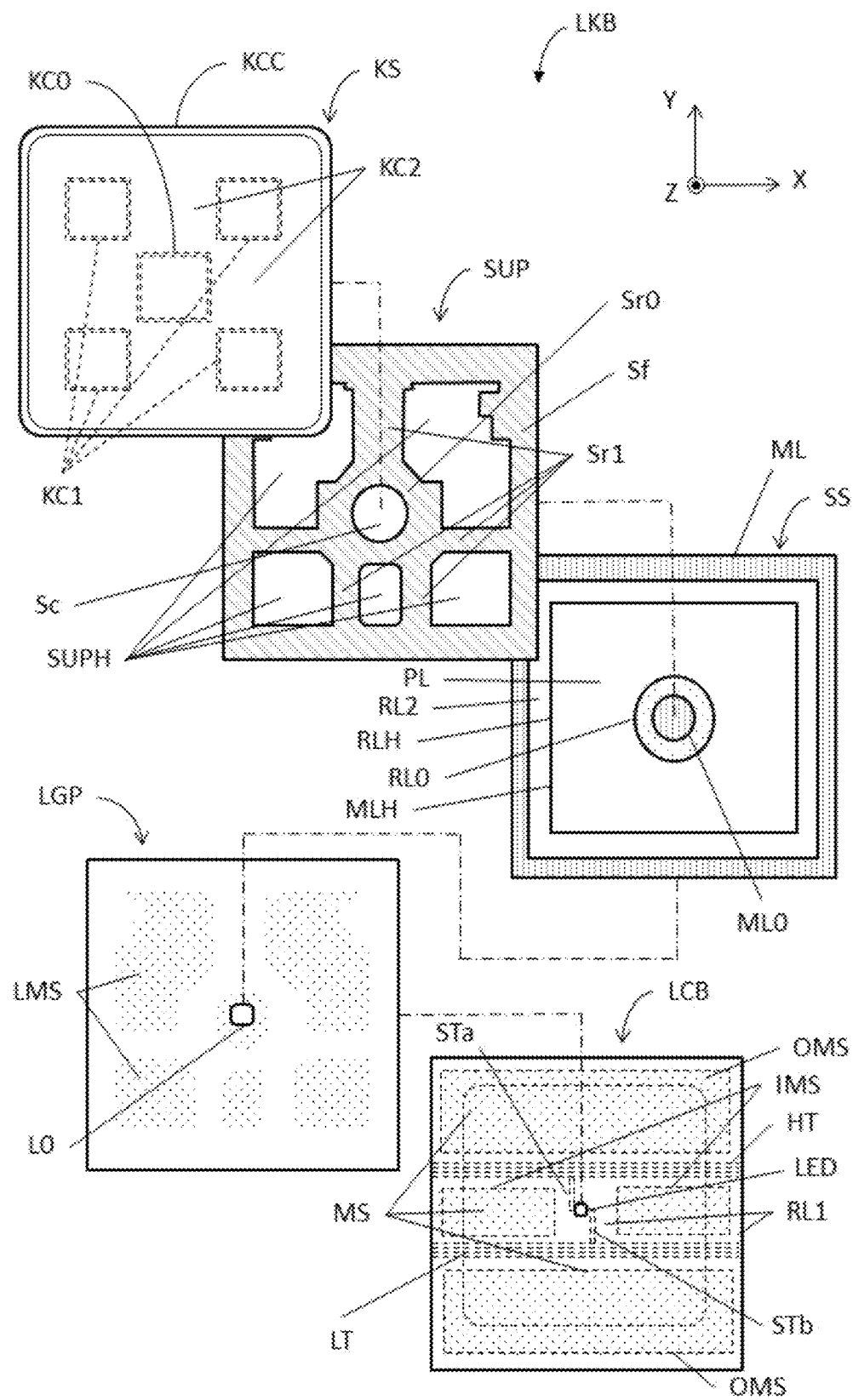
FIG. 3 is a partial exploded view illustrating the lighting keyboard shown in FIG. 1.
Figure 4:
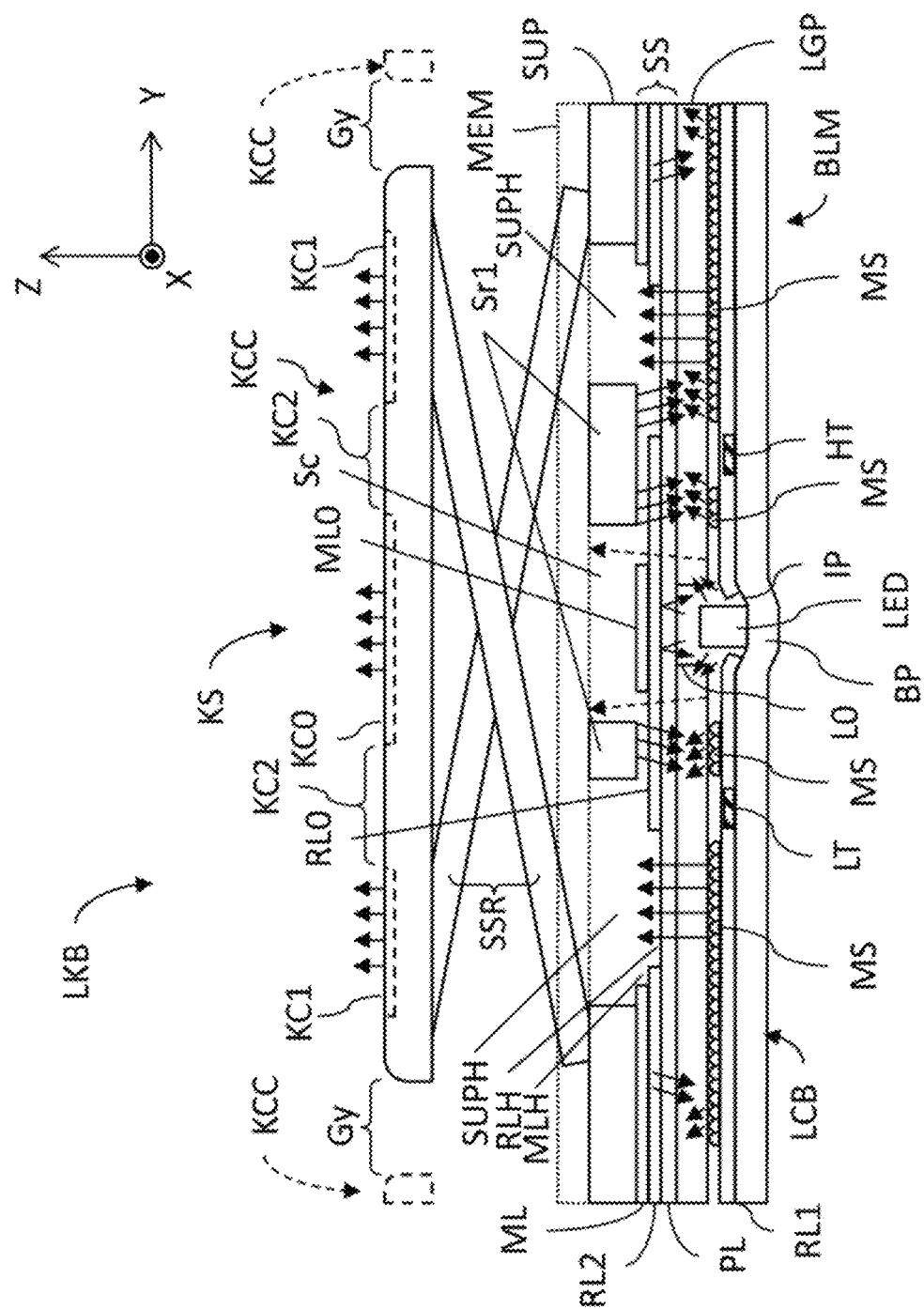
FIG. 4 is a partial sectional view illustrating the lighting keyboard shown in FIG. 1.

Referring to FIGS. 2 to 4, FIG. 2 is a partial top view illustrating the lighting keyboard LKB shown in FIG. 1, FIG. 3 is a partial exploded view illustrating the lighting keyboard LKB shown in FIG. 1, and FIG. 4 is a partial sectional view illustrating the lighting keyboard LKB shown in FIG. 1.

As shown in FIGS. 2 to 4, the lighting board LCB comprises two non-intersecting traces LT, HT, another two non-intersecting traces STa, STb, a light emitting unit LED, a first reflective layer RL1 and a plurality of microstructure regions MS. The lighting board LCB may be a lighting circuit board. The light emitting unit LED is connected between the two non-intersecting traces STa, STb, and the light emitting unit LED is connected between the two non-intersecting traces LT, HT through the two non-intersecting traces STa, STb. In this embodiment, the traces LT, HT are main traces of the light emitting unit LED and the traces STa, STb are sub-traces of the light emitting unit LED, wherein the trace LT may be a low-voltage trace and the trace HT may be a high-voltage trace. The light emitting unit LED may be a white LED or a combination of RGB LEDs according to practical applications. In general, the traces LT, HT may be the main traces with a larger cross-sectional area and may cross a plurality of keyswitches KS. The traces LT, HT do not intersect at least within a range of a single keyswitch KS, or do not intersect within a larger continuous range including a plurality of adjacent keyswitches KS and the gap(s) therebetween. The pair of traces STa, STb disposed within the range of each single keyswitch KS are sub-traces with a smaller cross-sectional area. Although the traces STa, STb may be located at the same line, the ends of the traces STa, STb are respectively connected to two electrodes of the light emitting unit LED. Thus, the traces STa, STb do not overlap with each other.

In another embodiment, the lighting board LCB may comprise a metal substrate and an exposed surface of the metal substrate may be used as the first reflective layer RL1 with micro-structure.

The first reflective layer RL1 is disposed on the two non-intersecting traces LT, HT and the other two non-intersecting traces STa, STb. The microstructure regions MS are formed on the first reflective layer RL1. In this embodiment, the microstructure regions MS may be a concave-convex structure formed on the first reflective layer RL1. For example, the lighting board LCB may be composed of a flexible circuit board and a copper mesh may be commonly used to improve the support strength of the circuit board. The first reflective layer RL1 may be formed by coating reflective paint or covering a reflective film on the surface of the flexible circuit board (including the surface of the copper mesh). The grid structure of the copper mesh may make the first reflective layer RL1 form regular concave points (grid points) and convex regions (grid lines). The concave points and convex regions function as reflective points capable of reflecting light back to the light guide panel LGP. In fact, copper wire regions (e.g. traces LT, HT, STa, STb) may also form protruding linear reflective regions. In principle, the copper mesh does not overlap with the traces LT, HT on the flexible circuit board and does not electrically connect the traces STa, STb. In practical applications, the copper mesh can achieve an effect of shielding radio frequency interference, so the copper mesh may be connected to the ground of the traces. However, in practice, a concave-convex reflective structure may not be possible to be formed by any reflective layer covering the copper mesh and traces. If the first reflective layer RL1 is an independent thin film component, the thickness of the first reflective layer RL1 must be thin enough, e.g. lower than the thickness of the copper foil substrate (including the adjacent tiled copper mesh and copper wire region). Furthermore, the first reflective layer RL1 needs to have a high degree of plasticity, so as to form a concave-convex microstructure on the copper mesh and copper wire region when covering the copper foil substrate. If the first reflective layer RL1 is formed by ink coating, the coating thickness, ink consistency, coating region control, etc. must be strictly controlled; otherwise the hollow space of the original copper foil substrate will be easily filled by ink flow, which will reduce the depth of the reflective microstructure and the effect of reflective diffusion.

In addition, even if the traces of the lighting board LCB are not copper foil substrate, there is neither a thicker copper trace nor a copper mesh to strengthen the structural strength of the lighting board LCB, a microstructure with a diffusion effect may still be formed on the first reflective layer RL1. For example, micro-dot ink may be printed on the first reflective layer RL1 to form concave/convex regions as the microstructure regions MS; or the ink with larger size reflective particles may be used to spray or print the first reflective layer RL1 to simultaneously form the concave/convex regions as the microstructure regions MS; or, if the first reflective layer RL1 is a layer of reflective film, as long as the surface of the reflective film has reflective particles with medium or low flatness and has a concave-convex reflective surface, the reflective film may be used as the microstructure regions MS.

In this embodiment, within a range of a single keyswitch KS, the microstructure regions MS comprises two inner microstructure regions IMS and two outer microstructure regions OMS, wherein the two inner microstructure regions IMS are located between the two non-intersecting traces LT, HT, and the two outer microstructure regions OMS are located beyond the two non-intersecting traces LT, HT. The patterns of the two inner microstructure regions IMS may be different from the patterns of the two outer microstructure regions OMS, but the invention is not so limited. The light emitting unit LED is located between the microstructure regions MS, i.e. the light emitting unit LED is located between the two inner microstructure regions IMS and also located between the two outer microstructure regions OMS.

In this embodiment, the traces STa, STb separate the two inner microstructure regions IMS, so the traces STa, STb are also located between the two inner microstructure regions IMS. Similarly, the traces LT, HT respectively separate one outer microstructure region OMS and two inner microstructure regions IMS, so it can also be said that the traces LT, HT are respectively located between one outer microstructure region OMS and two inner microstructure regions IMS. In some embodiments, the aforesaid microstructure regions MS, no matter whether they are the outer microstructure regions OMS or the inner microstructure regions IMS, neither overlap with the traces LT, HT, nor overlap with the traces STa, STb. For example, there is the case when the traces of the lighting board LCB are formed by copper wires with copper mesh. If the microstructure regions MS on the first reflective layer RL1 is only surface-treated and not formed from the underlying copper mesh or other substrates, the microstructure regions MS/OMS/IMS may overlap with the traces LT, HT, or overlap with the traces STa, STb. The light guide panel LGP has a light guide hole L0 and the light emitting unit LED is located in the light guide hole L0. The top surface and/or the bottom surface of the light guide panel LGP close to the light guide hole L0 may have adhesive around the light guide hole L0 to adhere the shielding sheet SS and/or the lighting board LCB respectively. Furthermore, the light guide panel LGP also has a plurality of microstructure regions LMS corresponding to the positions of an inner hole Sc and peripheral holes SUPH of the support plate SUP, so as to guide the light transmitted in the light guide panel LGP to emit out upward. Under the orthographic projection of the peripheral hole SUPH of the support plate SUP, the microstructure regions LMS of the light guide panel LGP may at least partially overlap with the microstructure regions MS of the first reflective layer RL1 of the lighting board LCB, such that it may increase the illuminating effect of the light passing through the inner hole Sc and the peripheral hole SUPH, and improve the brightness of the corner symbol of the keycap KCC (outer outlet KC1). The inner microstructure regions IMS, which is on the first reflective layer RL1 of the lighting board LCB and close to the light emitting unit LED, may be used as an optical adjustment manner. When the light output near the light emitting unit LED is excessively weakened (e.g. resulted from the area of an inner mask layer ML0 of a mask layer ML of the shielding sheet SS is too large, or the light transmittance of an inner reflective section RL0 of a second reflective layer RL2 is too low), at this time, the inner microstructure regions IMS, which is on the first reflective layer RL1 of the lighting board LCB and close to the light emitting unit LED, can enhance the illuminating effect of the light passing through the inner hole Sc or the inner outlet KC0 of the keycap KCC.

A preferred manner to optimize the arrangement of the aforesaid microstructure regions MS/OMS/IMS is to dispose the traces STa, STb, LT, HT as far as possible to overlap with any rib region or frame region (e.g. surrounding rib Sr0, bridge rib Sr1 and support frame Sf) of the support plate SUP. Thus, the aforesaid microstructure regions MS/OMS/IMS may correspond to the microstructure regions LMS of the light guide panel LGP, correspond to the peripheral hole SUPH or the inner hole Sc of the support plate SUP, and correspond to the inner outlet KC0 and the outer outlet KC1 of the keycap KCC. Furthermore, the microstructure regions MS/OMS/IMS may overlap with the surrounding rib Sr0, the bridge rib Sr1 or the support frame Sf. Although these positions cannot emit light, the microstructure regions MS/OMS/IMS can help guide the light that escapes from the light guide panel LGP into the light guide panel LGP for recycling, such that it is helpful for enhancing the illuminating effect of the light emitted from the outer side or even another adjacent keyswitch KS. Needless to say, the aforesaid microstructure regions MS/OMS/IMS may also overlap with the second reflective layer RL2 of the shielding sheet SS (including the inner reflective section RL0 and the outer frame of the second reflective layer RL2), and that is also helpful to recycle light into the light guide panel LGP.

The shielding sheet SS is disposed above the microstructure regions MS. The shielding sheet SS comprises a mask layer ML, a second reflective layer RL2 and a protection layer PL, wherein the mask layer ML, the second reflective layer RL2 and the protection layer PL may be stacked with each other by various manners. For example, each of the mask layer ML, the second reflective layer RL2 and the protection layer PL may be stacked on top, middle or bottom to form the shielding sheet SS. The mask layer ML is opaque. The second reflective layer RL2 may have reflective and translucent characteristics at the same time, i.e. the second reflective layer RL2 may reflect part of the light and allow part of the light to pass through. The mask layer ML may be black ink and the second reflective layer RL2 may be white ink, but the invention is not so limited. In this embodiment, the mask layer ML has a mask layer hole MLH and an inner mask layer ML0 located in the mask layer hole MLH, and the second reflective layer RL2 has a reflective layer hole RLH and an inner reflective section RL0 located in the reflective layer hole RLH. The mask layer hole MLH may be larger than, equal to or smaller than the reflective layer hole RLH, and the inner mask layer ML0 may be larger than, equal to or smaller than the inner reflective section RL0, wherein it depends on the desired illuminating effect. The inner mask layer ML0 and the inner reflective section RL0 are located above the light emitting unit LED. In this embodiment, the inner mask layer ML0 and/or the inner reflective section RL0 above the light emitting unit LED is at least partially projected between the two non-intersecting traces LT, HT or between the two non-intersecting traces STa, STb.

Each of the keyswitches KS comprises a part of the support plate SUP. In this embodiment, the support plate SUP has an inner hole Sc, a surrounding rib Sr0, a plurality of bridge ribs Sr1 and a support frame Sf, wherein the surrounding rib Sr0 surrounds the inner hole Sc, and the bridge ribs Sr1 connect the surrounding rib Sr0 and the support frame Sf. Furthermore, there are a plurality of peripheral holes SUPH between the bridge ribs Sr1, the surrounding rib Sr0 and the support frame Sf. In this embodiment, the two inner microstructure regions IMS at least partially overlap with projections of the inner hole Sc, the surrounding rib Sr0, the bridge ribs Sr1 and/or the support frame Sf. Still further, the two outer microstructure regions OMS at least partially overlap with projections of the surrounding rib Sr0, the plurality of bridge ribs Sr1 and/or the support frame Sf.

The keyswitch KS comprises a keycap KCC, a support mechanism SSR, a circuit board MEM and a support plate SUP. The keycap KCC is disposed with respect to the support plate SUP. The keycap KCC has an inner outlet KC0 and a plurality of outer outlets KC1, wherein the inner outlet KC0 and the outer outlets KC1 are surrounded by an opaque area KC2. The positions of the inner outlet KC0 and the outer outlets KC1 correspond to the positions of the inner hole Sc and the peripheral holes SUPH of the support plate SUP, such that the light emitted by the light emitting unit LED may be projected from the inner outlet KC0 and the outer outlets KC1 of the keycap KCC through the light guide panel LGP, the shielding sheet SS, the inner hole Sc and the peripheral holes SUPH of the support plate SUP. The support mechanism SSR is disposed between the keycap KCC and the support plate SUP. When the keycap KCC is pressed, the keycap KCC will move vertically toward the support plate SUP along with the support mechanism SSR. Furthermore, a restoration member (not shown) may be further disposed between the keycap KCC and the support plate SUP, wherein the restoration member may be, but is not limited to, a rubber dome. The circuit board MEM may have a switch (e.g. membrane switch or other trigger switches) corresponding to the keyswitch KS.

From top view, the light emitting unit LED, the light guide hole L0, the inner reflective section RL0, the inner mask layer ML0, the inner hole Sc, the inner outlet KC0 and the adhesive around the light guide hole L0 may be located between the two non-intersecting traces LT, HT and/or STa, STb.

From top view, the light emitting unit LED, the light guide hole L0, the inner reflective section RL0, the inner mask layer ML0, the inner hole Sc, the inner outlet KC0 and the adhesive around the light guide hole L0 may be located between the two inner microstructure regions IMS.

As shown in FIG. 4, the backlight module BLM further comprises a protrusion structure BP, wherein the position of the protrusion structure BP corresponds to the position of the light emitting unit LED, and the protrusion structure BP is located between the two non-intersecting traces LT, HT. Furthermore, the protrusion structure BP is also located between the microstructure regions MS, i.e. the protrusion structure BP is located between the two inner microstructure regions IMS and also located between the two outer microstructure regions OMS. In this embodiment, the protrusion structure BP is formed on the lighting board LCB and the protrusion structure BP forms a notch IP for accommodating the light emitting unit LED, such that an upper surface of the light emitting unit LED is flash with or lower than an upper surface of the light guide panel LGP and higher than a lower surface of the light guide panel LGP. Since the shielding sheet SS is disposed on the light guide panel LGP, the upper surface of the light emitting unit LED is also flash with or lower than a lower surface of the shielding sheet SS, such that the shielding sheet SS can be kept flat and will not be pushed by the light emitting unit LED to partially enter the inner hole Sc of the support plate SUP. Accordingly, the amount of light emitted by the light emitting unit LED entering the light guide panel LGP can be increased, so as to enhance the overall illuminating consistency. Moreover, the circuit board MEM may have a switch disposed with respect to the inner hole Sc of the support plate SUP, such that the switch may partially enter the inner hole Sc of the support plate SUP without interfering with the shielding sheet SS and the light emitting unit LED below the shielding sheet SS.

Figure 5:
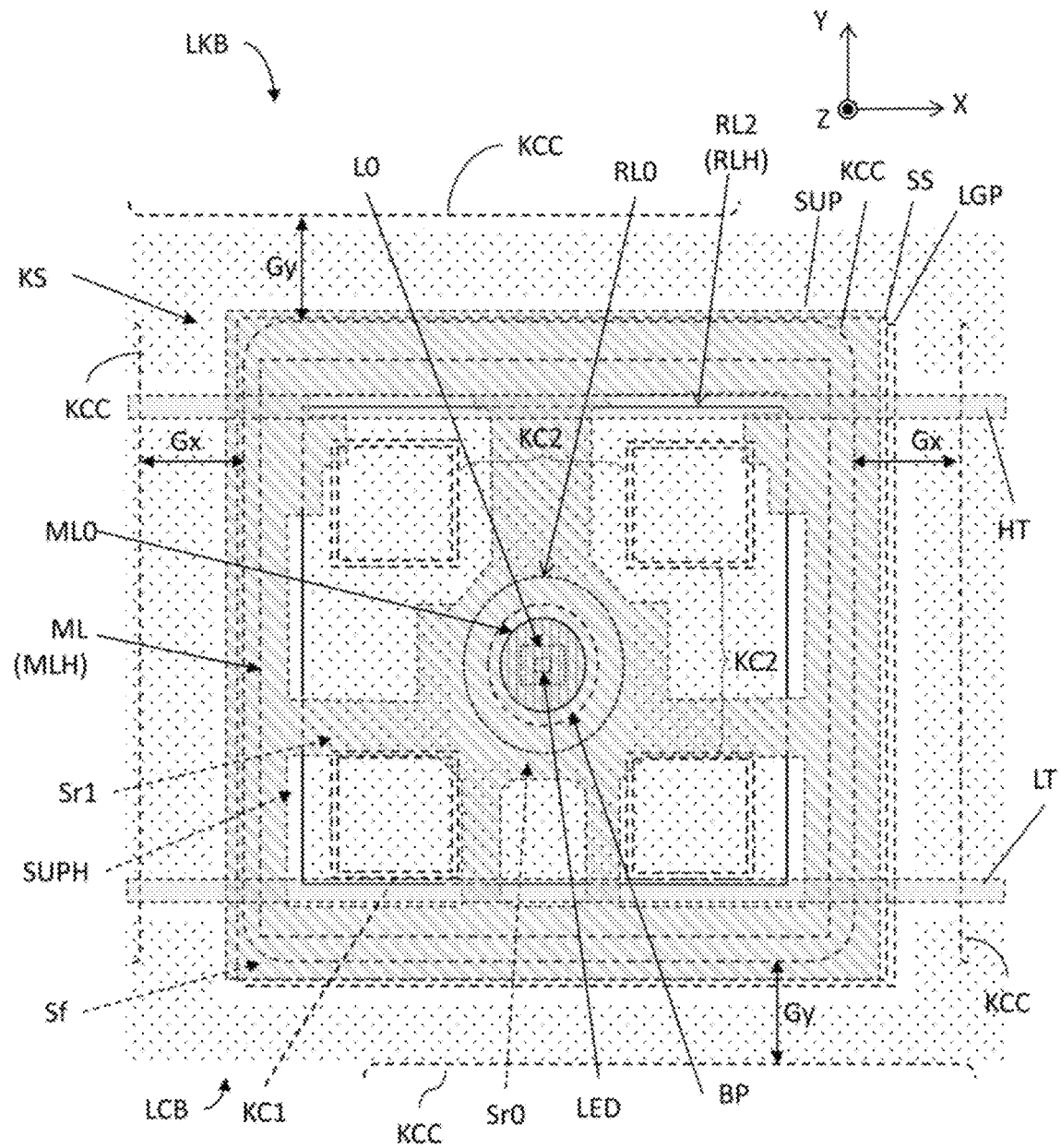
FIG. 5 is a partial top view illustrating the lighting keyboard according to another embodiment of the invention.
Figure 6:
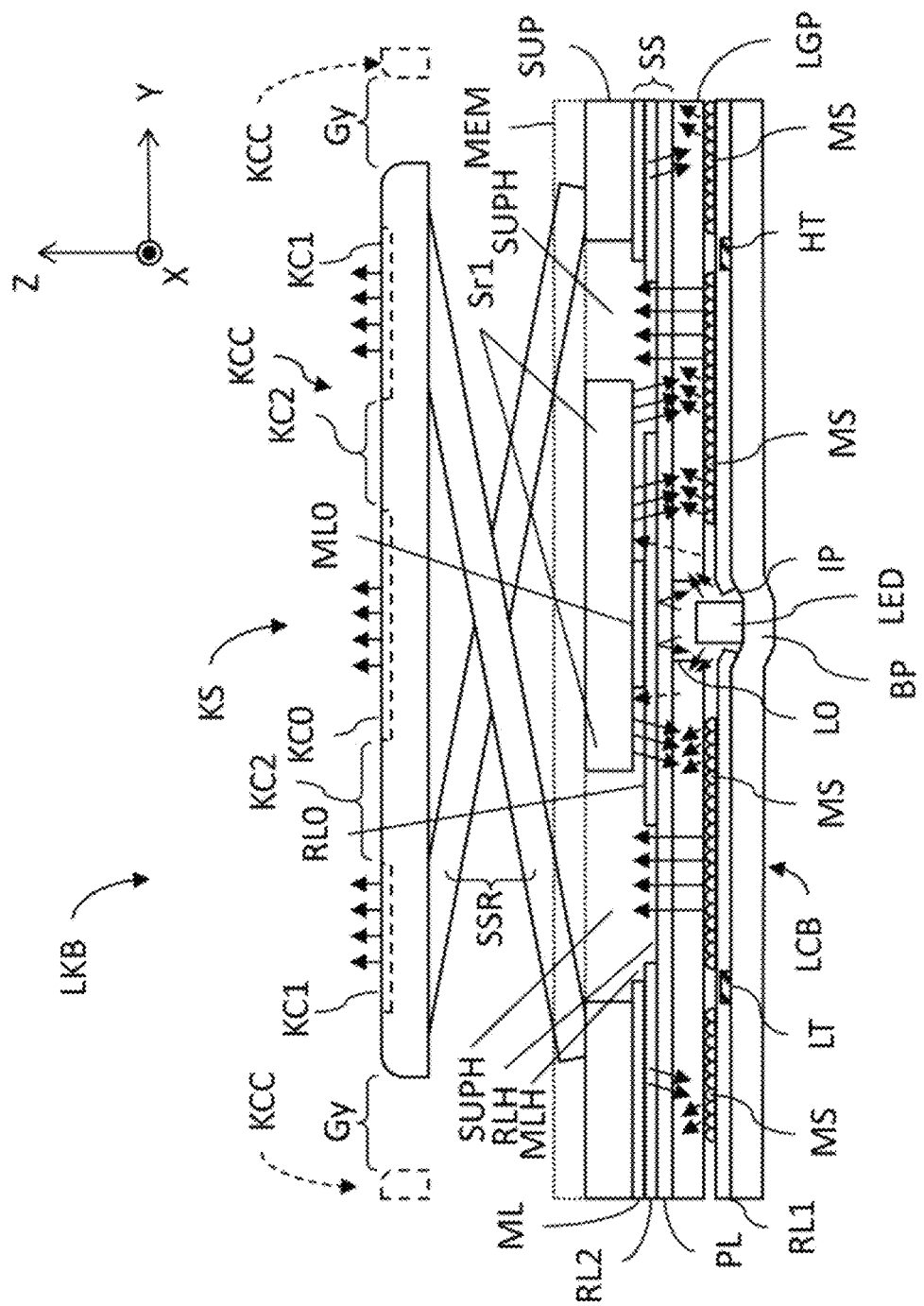
FIG. 6 is a partial sectional view illustrating the lighting keyboard shown in FIG. 5.

Referring to FIGS. 5 and 6, FIG. 5 is a partial top view illustrating the lighting keyboard LKB according to another embodiment of the invention, and FIG. 6 is a partial sectional view illustrating the lighting keyboard LKB shown in FIG. 5.

As shown in FIGS. 5 and 6, the support plate SUP may not have the aforesaid inner hole Sc. At this time, the shielding sheet SS is kept flat and will not be pushed by the light emitting unit LED. When the support plate SUP does not have the inner hole Sc, the keycap KCC may have no inner outlet KC0. However, if the keycap KCC has the inner outlet KC0, the peripheral holes SUPH around the central area of the keycap KCC may be used to emit light, such that the light is projected from the inner outlet KC0 without the inner hole Sc. In this embodiment, the two non-intersecting traces HT, LT may overlap with a projection of at least one of the at least one outer outlet KC1. As long as the two non-intersecting traces HT, LT meet at least one of the following three conditions, the traces HT, LT will not affect the light emitted from the outer outlet KC1 of the keycap KCC. Condition 1: the two non-intersecting traces HT, LT overlap with projections of the surrounding rib Sr0, the bridge ribs Sr1 and/or the support frame Sf. Condition 2: the two non-intersecting traces HT, LT overlap with projections of the mask layer ML and/or the second reflective layer RL2 of the shielding sheet SS. Condition 3: the two non-intersecting traces HT, LT overlap with projections of the opaque area KC2 of the keycap KCC.

Figure 7:
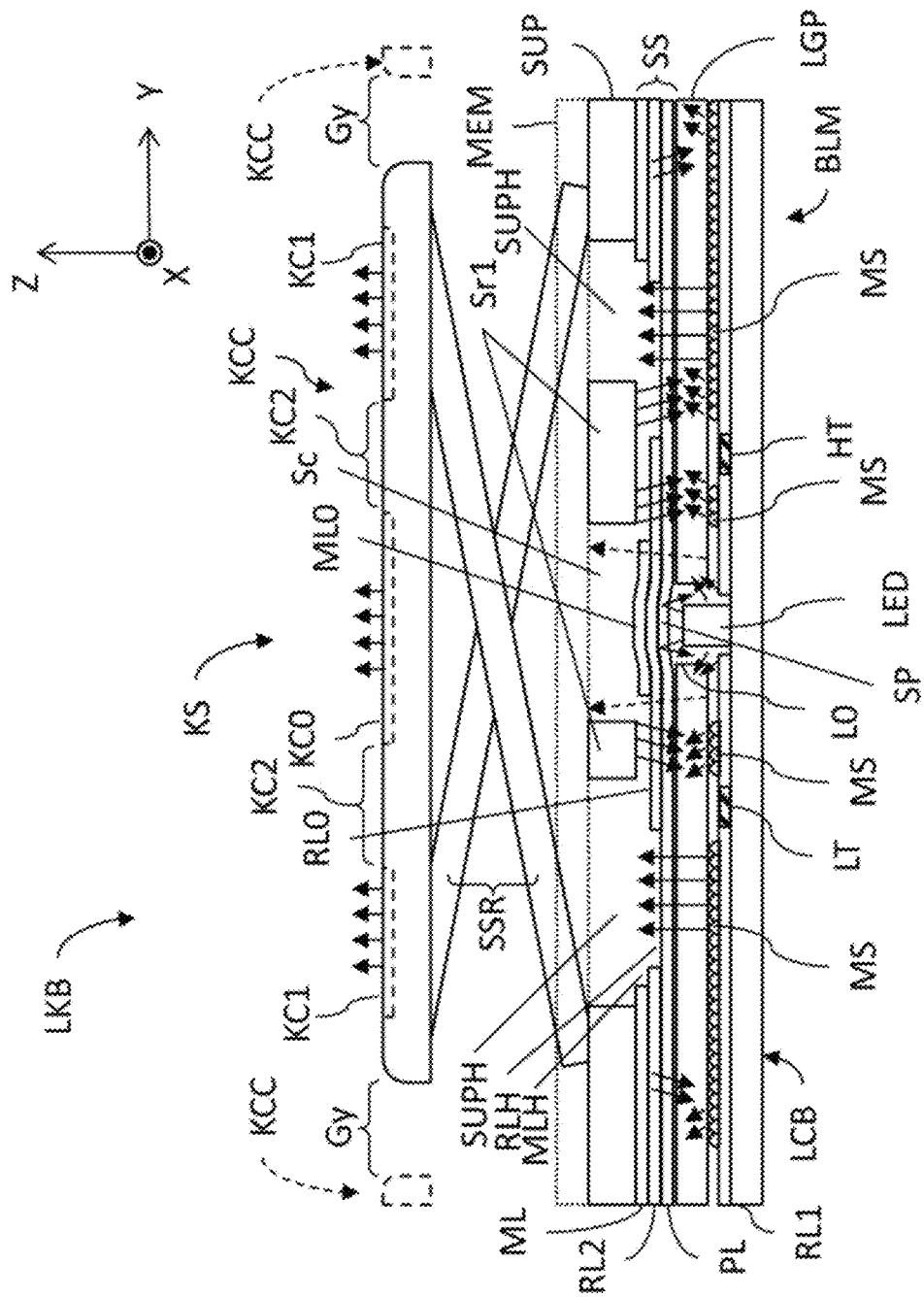
FIG. 7 is a partial sectional view illustrating the lighting keyboard according to another embodiment of the invention.

Referring to FIG. 7, FIG. 7 is a partial sectional view illustrating the lighting keyboard LKB according to another embodiment of the invention.

As shown in FIG. 7, a protrusion structure SP of the backlight module BLM may be formed on the shielding sheet SS, wherein the light emitting unit LED is located below the protrusion structure SP. The position of the protrusion structure SP corresponds to the position of the light emitting unit LED, and the protrusion structure SP is located between the two non-intersecting traces LT, HT. Furthermore, the protrusion structure SP is also located between the microstructure regions MS, i.e. the protrusion structure SP is located between the two inner microstructure regions IMS and also located between the two outer microstructure regions OMS. In this embodiment, the protrusion structure SP may be lower than or slightly enter the inner hole Sc of the support plate SUP, and an upper surface of the light emitting unit LED is flash with or lower than an upper surface of the light guide panel LGP or a lower surface of the shielding sheet SS. In FIG. 7, since the protrusion structure SP is formed on the shielding sheet SS, the second reflective layer RL0 of the shielding sheet SS above the light emitting unit LED forms a curved surface or an inclined surface due to the protrusion structure SP. Because the reflection angle provided by the flat second reflective layer RL0 is small, it is difficult to guide the light emitted upward to directly enter the wall of the light guide hole L0 of the light guide panel LGP.

Figure 8:
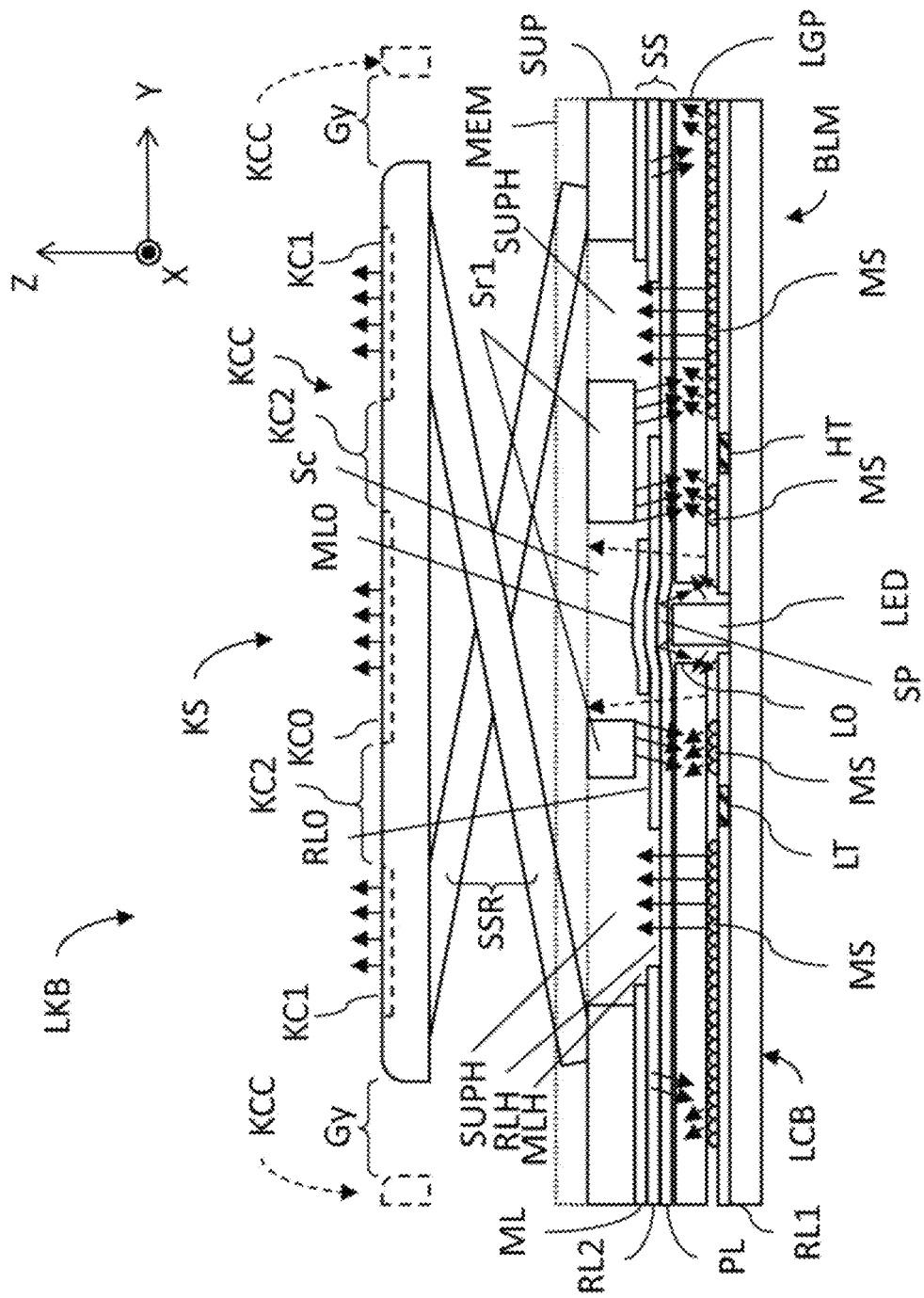
FIG. 8 is a partial sectional view illustrating the lighting keyboard according to another embodiment of the invention.

Referring to FIG. 8, FIG. 8 is a partial sectional view illustrating the lighting keyboard LKB according to another embodiment of the invention.

As shown in FIG. 8, an upper surface of the light emitting unit LED may be higher than an upper surface of the light guide panel LGP and lower than a lower surface of the shielding sheet SS, i.e. the upper surface of the light emitting unit LED may be located between the upper surface of the light guide panel LGP and the lower surface of the shielding sheet SS. In other words, if necessary, the upper surface of the light emitting unit LED may exceed the upper surface of the light guide panel LGP. For example, the protrusion structure SP protrudes upward may release the thickness of the shielding sheet SS itself and the thickness of the adhesive layers above and below the shielding sheet SS to provide a space for accommodating the light emitting unit LED. At this time, the upper surface of the light emitting unit LED is located between the lower surface of the support plate SUP and the upper surface of the light guide panel LGP. Accordingly, when the upper surface of the light emitting unit LED is higher than the upper surface of the light guide panel LGP, the protrusion structure SP may provide a space for accommodating the light emitting unit LED, so as to prevent the light emitting unit LED from interfering with the shielding sheet SS.

Figure 9:
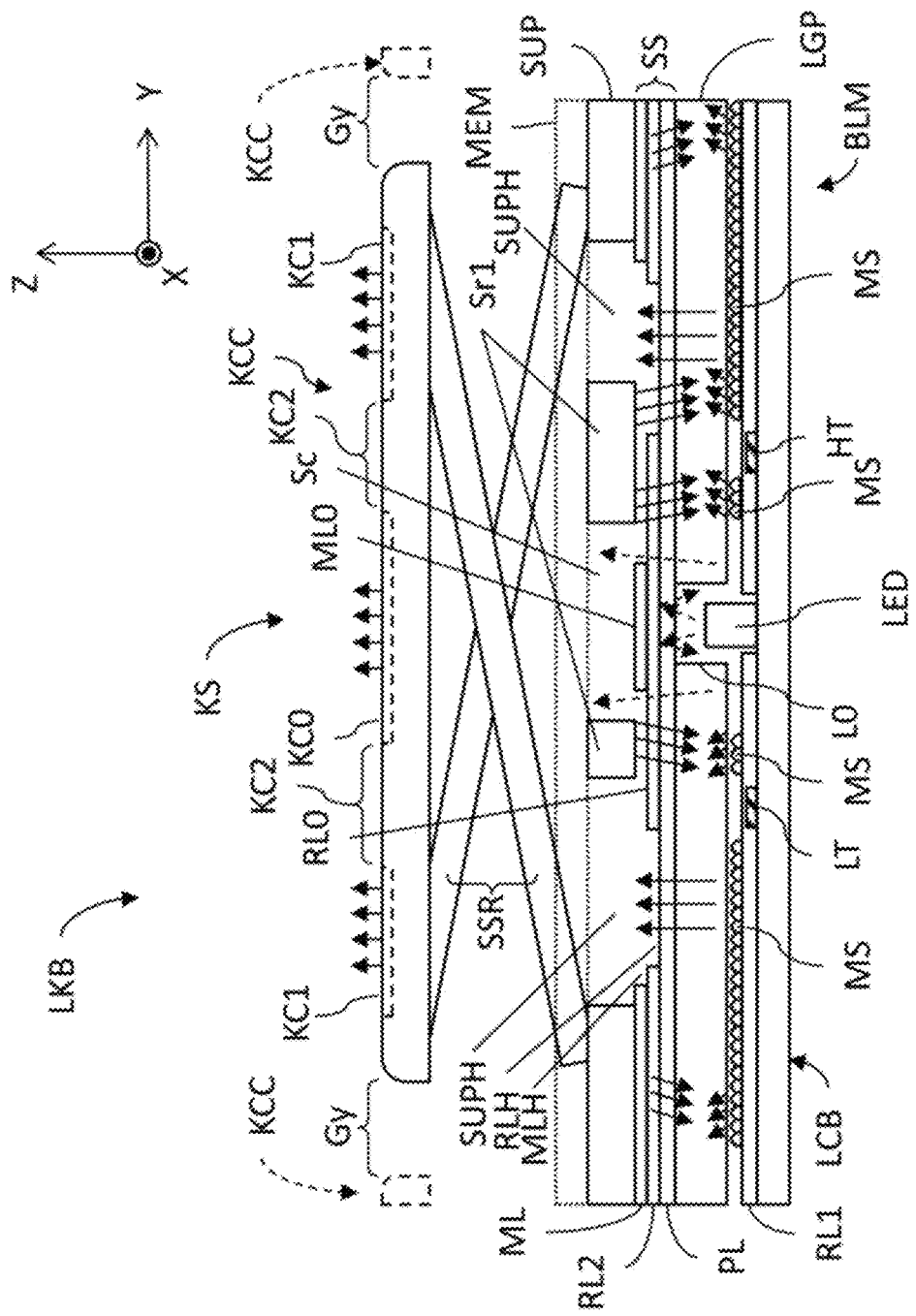
FIG. 9 is a partial sectional view illustrating the lighting keyboard according to another embodiment of the invention.

Referring to FIG. 9, FIG. 9 is a partial sectional view illustrating the lighting keyboard LKB according to another embodiment of the invention.

As shown in FIG. 9, the lighting keyboard LKB may not comprise the protrusion structure BP shown in FIG. 4 or the protrusion structure SP shown in FIG. 7. In this embodiment, an upper surface of the light emitting unit LED is flash with or lower than an upper surface of the light guide panel LGP and higher than a lower surface of the light guide panel LGP. Accordingly, the amount of light emitted by the light emitting unit LED entering the light guide panel LGP can be increased, so as to enhance the overall illuminating consistency.

Figure 10:
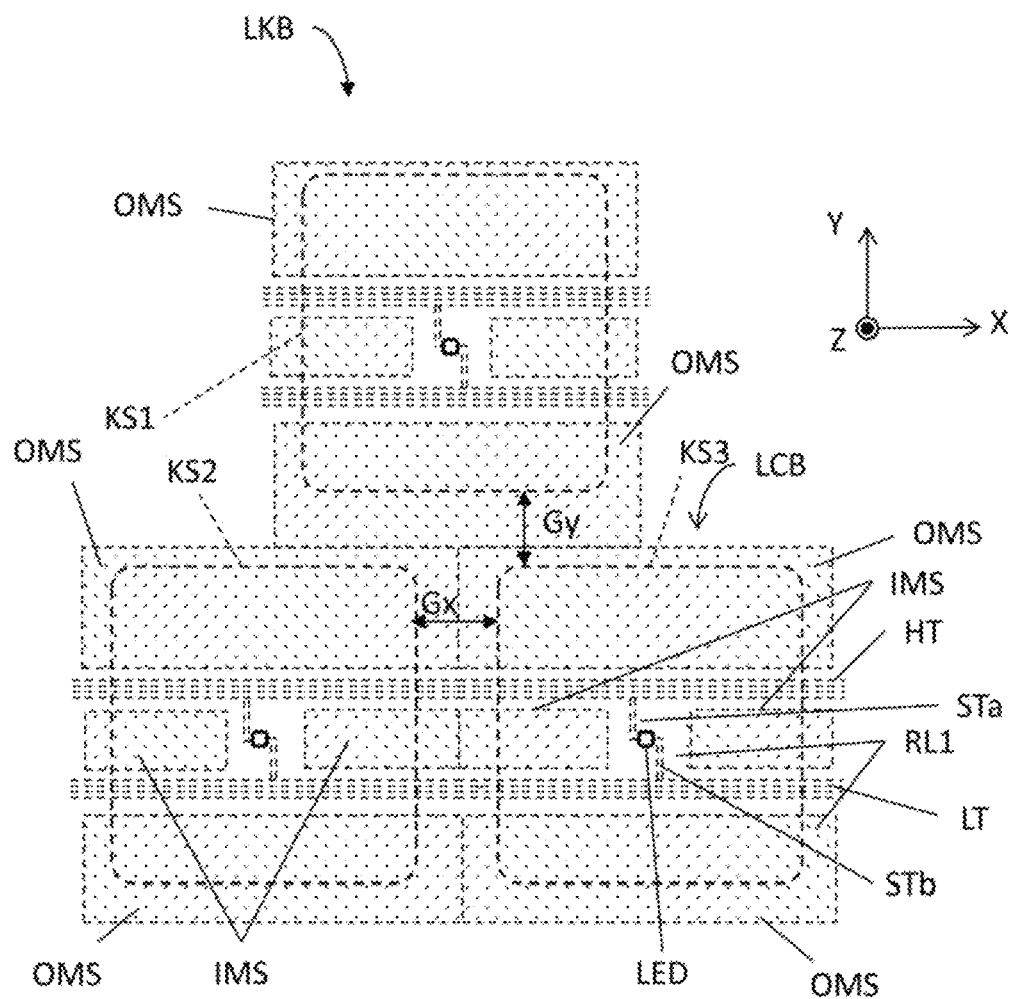
FIG. 10 is another partial top view illustrating the lighting keyboard shown in FIG. 1.

Referring to FIG. 10, FIG. 10 is another partial top view illustrating the lighting keyboard LKB shown in FIG. 1.

As shown in FIG. 10, at least parts of the microstructure regions OMS, IMS overlap with the gaps Gx, Gy between any two adjacent keyswitches KS1, KS2, KS3. Three adjacent keyswitches KS1, KS2, KS3 may have three adjacent outer microstructure regions OMS, wherein the three adjacent outer microstructure regions OMS are joined together in the X and Y directions. The two outer microstructure regions OMS disposed outside two non-intersecting traces of the lighting board LCB under a keyswitch KS may have the same pattern, which may have same size, same shape and same distance (outside the traces) in two identical regions. Within the projected range of a single keyswitch KS (e.g. square key), the two outer microstructure regions OMS may have different patterns defined by the keyswitch KS. For two adjacent keyswitches KS in the Y direction, the two outer microstructure regions OMS may have different patterns defined by the two adjacent keyswitches KS.

Figure 11:
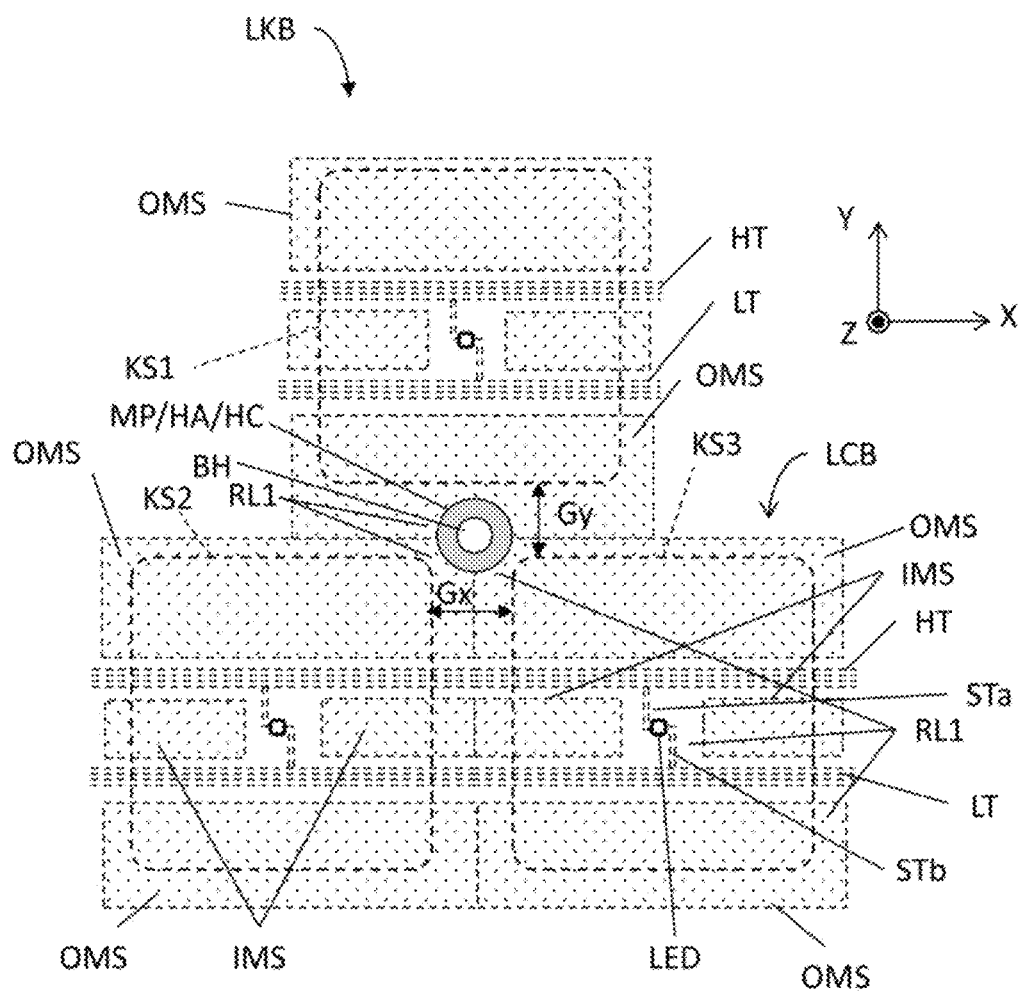
FIG. 11 is another partial top view illustrating the lighting keyboard shown in FIG. 1.

Referring to FIG. 11, FIG. 11 is another partial top view illustrating the lighting keyboard LKB shown in FIG. 1.

As shown in FIG. 11, a board hole BH may be formed on the lighting board LCB, wherein the board hole BH is used for fixing or heat dissipation. A mask portion MP may be disposed on the lighting board LCB, wherein the mask portion MP surrounds the board hole BH and is used to shield and absorb light, so as to prevent the light from leaking from the board hole BH. In practice, the mask portion MP may be a light absorbing or opaque substrate of the lighting board LCB, i.e. the first reflective layer RL1, trace layer and insulating layer (if necessary) above the substrate of the lighting board LCB are all formed with corresponding holes larger than the board hole BH, so as to expose the mask portion MP surrounding the board hole BH. Another manner in practice is to coat a layer of mask portion MP on the upper surface of the first reflective layer RL1 of the lighting board LCB to surround the board hole BH. At this time, the hole size of the first reflective layer RL1 is similar to the board hole BH. The board hole BH and the mask portion MP on the lighting board LCB may correspond to a board hole and a mask portion (not shown) on the shielding sheet SS. A hole adhesive HA on the lighting board LCB may be disposed on the mask portion MP and surround the board hole BH. A hole clearance HC does not overlap with the outer microstructure regions OMS or any microstructure. The hole clearance HC without the first reflective layer RL1 may be defined between the first reflective layer RL1 and the board hole BH. The hole clearance HC without an adhesive may be defined between the hole adhesive HA and the board hole BH. The inner microstructure regions (between the two non-intersecting traces HT, LT and/or between the two non-intersecting traces STa, STb) do not overlap with the board hole BH, the hole adhesive HA and/or the hole clearance HC. A plurality of adjacent keyswitches KS1, KS2, KS3 in the X and/or Y direction may have adjacent outer microstructure regions OMS that jointly surround the mask portion MP, the board hole BH, the hole adhesive HA and/or the hole clearance HC. The mask portion MP, the board hole BH, the hole adhesive HA and/or the hole clearance HC is located between the traces HT, LT corresponding to the keyswitch KS1 and the traces HT, LT correspond to the keyswitches KS2, KS3. For further explanation, the mask portion MP, the board hole BH, the hole adhesive HA and/or the hole clearance HC may be located between the trace LT corresponding to the keyswitch KS1 and the trace HT correspond to the keyswitches KS2, KS3. It should be noted that the mask portion MP, the hole adhesive HA and the hole clearance HC are schematically illustrated at the same position shown in FIG. 11. However, the definitions of the mask portion MP, the hole adhesive HA and the hole clearance HC can be clearly understood from the above description.

As mentioned in the above, the invention makes the plurality of microstructure regions on the lighting board not overlap with the two non-intersecting traces. Accordingly, the microstructure regions specifically arranged on the lighting board can be used to recycle light or assist light output, so as to enhance the overall illuminating consistency. Furthermore, although the technical feature of the invention is depicted to solve the problem of low power light emitting unit, the invention is also applicable to an application of medium or high power light emitting unit in a backlight module.

Moreover, the size of the low power light emitting unit is too small. When the low power light emitting unit is installed on the lighting board, the position of the light emitting unit will easily shift due to the melting of the solder paste, such that the light emitting unit cannot be electrically connected to the lighting board well. The following embodiments of the invention will introduce several technical solutions with special pad design.

Figures 12A, 12C:
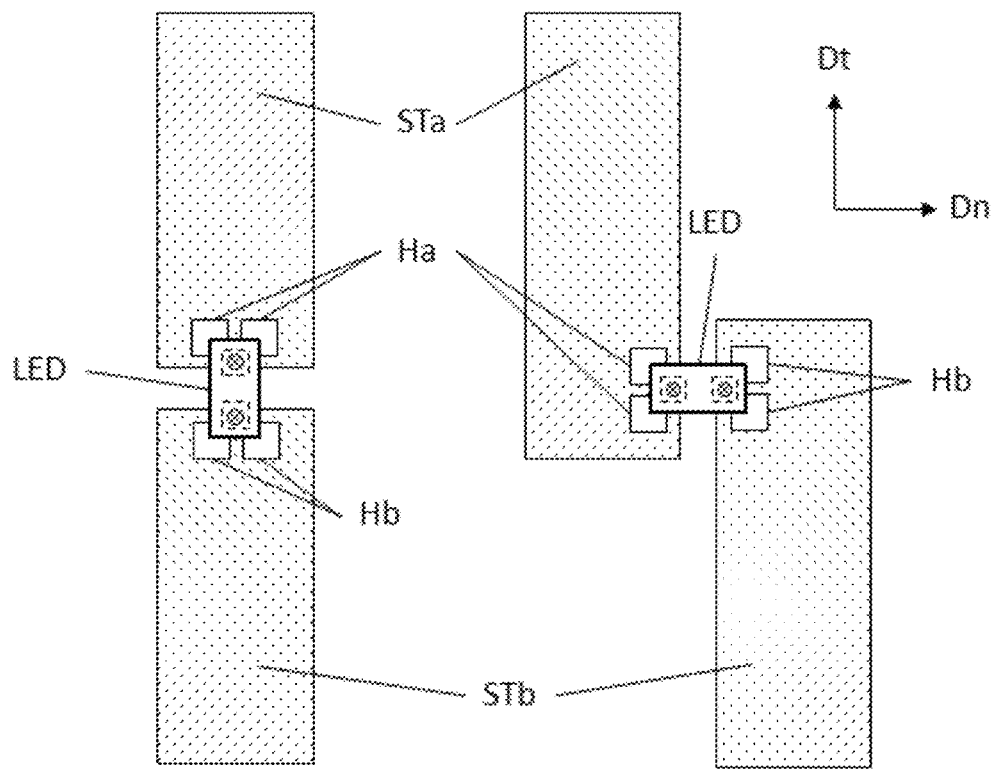
FIG. 12A is a schematic top view illustrating end-to-end connection between the sub-traces of the lighting board, the pads and the light emitting unit according to another embodiment of the invention.
FIG. 12C is a schematic top view illustrating the embodiment shown in FIG. 12A in side connection.
Figure 12B:
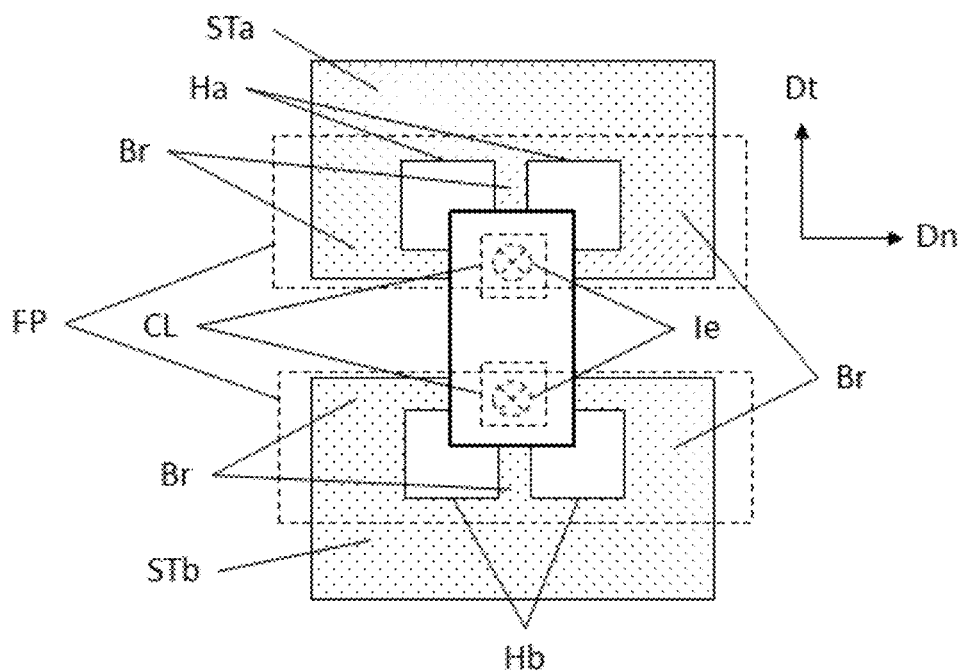
FIG. 12B is partial enlarged view illustrating the embodiment shown in FIG. 12A.

Referring to FIGS. 12A to 12C, FIG. 12A is a schematic top view illustrating end-to-end connection between the sub-traces of the lighting board, the pads and the light emitting unit according to another embodiment of the invention, FIG. 12B is partial enlarged view illustrating the embodiment shown in FIG. 12A, and FIG. 12C is a schematic top view illustrating the embodiment shown in FIG. 12A in side connection.

As shown in FIGS. 12A and 12B, two sub-traces STa/STb (see the aforesaid embodiments and FIGS. 3, 8 and 9) extend along a trace direction Dt, there is a pad FP at the end of each of the two sub-traces STa/STb, and there is a pad gap FG between two pads FP. Each pad FP may be integrally formed with the circuit (e.g. traces HT/LT/STa/STb) of the lighting board LCB by printing conductive wires or integrally formed with the circuit of the lighting board LCB by copper foil substrate etching process. However, each pad FP may also be formed by overmolding process, or made of different material from the circuit of the lighting board LCB. Each pad FP take an intersection point IE as the end, and the distance between two intersection points IE is also the shortest distance between two pads FP. The pad gap FG between the two intersection points IE is smaller than a long side of the light emitting unit LED, for example, the gap between the two intersection points IE is close to 0.5 times the long side of the light emitting unit LED or shorter. The intersection point IE may essentially be the tail point of the adjacent ends of the two pads FP, or the geometric center point of the adjacent ends of the two pads FP. The two pads FP of the invention respectively have at least two branches extending outward from the intersection points IE, so as to define at least one hollow area Ha/Hb. As show in FIGS. 12A and 12B, each pad FP has three branches Br, wherein the middle branch Br extends straight outward from the intersection points IE to connect the sub-traces STa/STb. The remaining left and right two branches Br extend outward to form L-shaped paths to connect the sub-traces STa/STb. The three branches Br of each pad FP jointly define two hollow areas Ha/Hb. The border between the two hollow areas Ha/Hb extends along with the middle branch Br.

The positive and negative electrodes of the light emitting unit LED are electrically connected to the two pads FP through a conductive layer CL respectively, and the connection position is located at the two intersection points IE or the adjacent area thereof. The conductive layer CL may be achieved, for example, by solder paste or an alternative material. The thickness and area of the conductive layer CL will affect the degree of offset of the light emitting unit LED during mounting process. Therefore, the printing of the conductive layer CL must be concentrated on the intersection point IE of the two pads FP as much as possible and extend along with the branch Br finitely. The connection direction of the positive and negative electrodes of the light emitting unit LED or the long side of the light emitting unit LED is parallel to the trace direction Dt. The width of the two pads FP (flat side) may be set to be at least 0.8-1.5 times the short side of the LED. If the light emitting unit LED shifts along the normal direction Dn of the traces STa/STb or along the short side direction of the light emitting unit LED, there is still a considerable chance that the positive and negative electrodes of the light emitting unit LED may be electrically connected to the two pads FP. If the light emitting unit LED shifts along the trace direction of the traces STa/STb or along the long side direction of the light emitting unit LED, the shift must be more than 0.5 times the length of the long side of the light emitting unit LED, such that the light emitting unit LED cannot be electrically connected to the two pads FP at the same time. No matter how the light emitting unit LED shifts, the light emitting unit LED at least partially overlaps with one hollow area Ha or Hb of one pad FP, e.g. a corner or a side of the light emitting unit LED overlaps with at least one hollow area Ha or Hb. The overall size of the two pads FP (including the hollow area Ha or Hb, the branch Br and the pad gap FG) may be set to be at least 1.2 times the light emitting unit LED; or the two pads FP respectively have at least one branch Br to form a pair of flat sides parallel to each other, and the short side of the light emitting unit LED is preferably smaller than the width of the pair of flat sides of the two pads FP. Accordingly, even in the case of maximum offset, the light emitting unit LED (either side) does not exceed the outermost periphery of any pad FP. In the ideal case of no offset during mounting process, all four corners of the light emitting unit LED may overlap with the hollow area Ha or Hb respectively. However, under the premise that the process parameters are highly stable, the flat side of the pad FP may be smaller than or equal to the short side of the light emitting unit LED. Even so, at least the light emitting unit LED (such as a specific side or corner) must be able to overlap with the hollow area Ha/Hb to maintain the basic offset prevention mechanism.

The first significance of the existence of the hollow area Ha/Hb is to provide at least two branches Br for each pad FP, which may be used to connect the positive/negative electrodes of the light emitting unit LED. Secondly, the intersection point IE at the intersection of the branches Br (or the end of the junction of the two hollow areas Ha/Hb) may be used as the positioning point of the light emitting unit LED in the automated manufacturing process. Furthermore, the conductive layer CL is easy to flow along the branch Br during melting, and the existence of the hollow area Ha/Hb prevents the conductive layer CL from flowing toward the hollow area Ha/Hb to a specific extent during melting. Still further, the width of each branch Br may only be 0.5 times or thinner than the short side of the light emitting unit LED, so as to limit the range/angle of the molten flow of the conductive layer CL from spreading, and further limit the angle/path of the light emitting unit LED to shift. Thus, it may ensure that the light emitting unit LED will shift along the branch Br, and improve the yield rate of the light emitting unit LED electrically connecting the two pads FP and the two traces STa/STb.

Referring to FIGS. 12A to 12C, the traces STa/STb shown in FIGS. 12A and 12B are in end-to-end state, and two hollow areas Ha and two hollow areas Hb are arranged perpendicular to the trace direction Dt. FIG. 12C is quite different. The traces STa/STb partially overlap in the vertical trace direction Dt and are in side-to-side state. Therefore, the positions of the two pads FP are rotated by 90 degrees, and the two hollow areas Ha and the two hollow areas Hb are all arranged along the trace direction. Regardless of the end-to-end or side-to-side connection, the hollow area Ha/Hb of the pad FP and the branch Br may effectively improve the yield rate of the light emitting unit LED electrically connecting the two pads FP and the two traces STa/STb.

Referring to FIGS. 13A to 13F along with FIGS. 12A to 12C, FIGS. 13A to 13F are schematic top views illustrating connection structure between the sub-traces of the lighting board, two pads and the light emitting unit according to different embodiments of the invention.

Figure 13A:
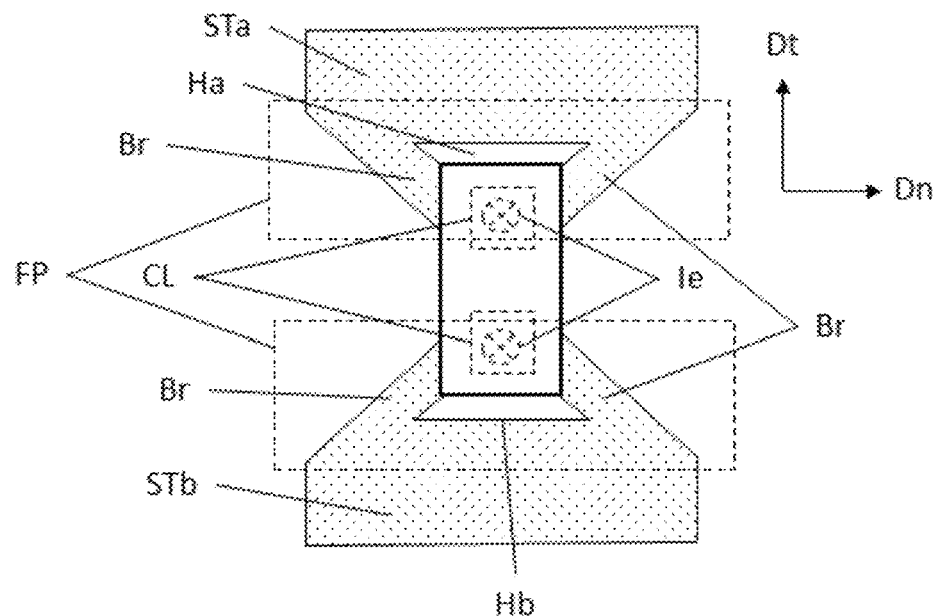
FIGS. 13A to 13F are schematic top views illustrating connection structure between the sub-traces of the lighting board, two pads and the light emitting unit according to different embodiments of the invention.
Figure 13B:
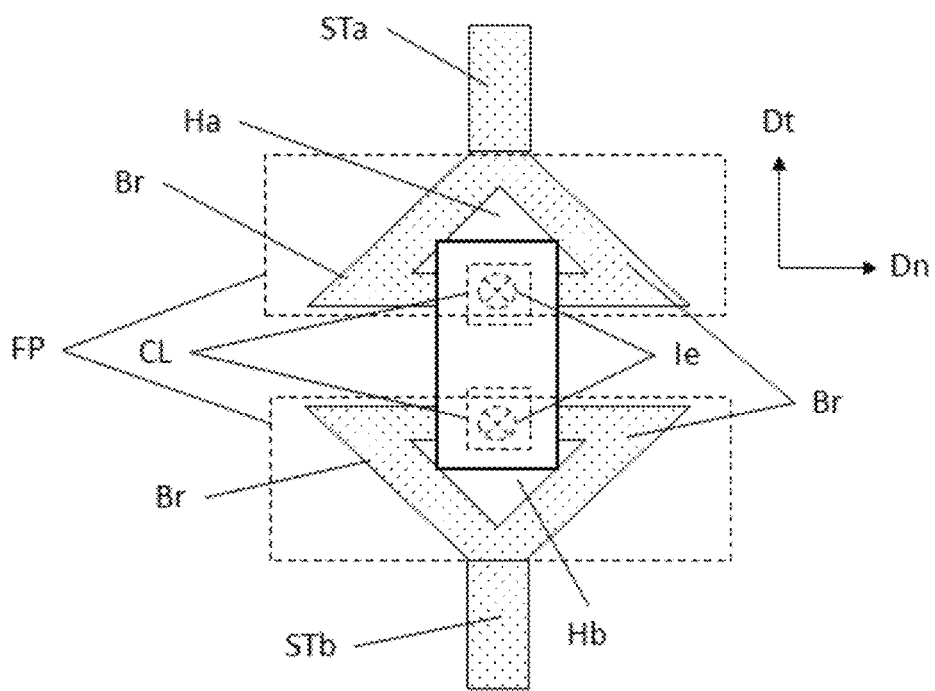

As shown in FIGS. 12A to 12C, three branches Br form a T shape, and each branch Br is at least partially parallel to the short side and the long side of the light emitting unit LED, but the invention is not so limited. As shown in FIG. 13A, each pad FP has only two branches Br extending obliquely outward from the intersection point IE, and the two branches Br of each pad FP form an obtuse angle and finally define a hollow area Ha/Hb with the two traces STa/STb. Although the light emitting unit LED in FIG. 13A still at least partially overlaps with the hollow areas Ha and/or Hb, the distance between the two branches Br on the same side of different pads FP will become larger and larger when the light emitting unit LED shifts leftward and rightward along the normal direction Dn. Therefore, the obtuse angle included between the two branches Br of each pad FP should not be too small, for example, between 150° and 180°, so as to prevent the light emitting unit LED from shifting beyond the width of the two electrodes. A preferred embodiment similar to FIG. 13A is shown in FIG. 13B. It is also a pad FP similar to a triangle, and two angular branches Br form a flat side opposite to the flat side formed by the branch Br of another pad FP. In this way, when the light emitting unit LED shifts, there will be no problem of changing the distance between the two branches Br on the same side of different pads FP. Moreover, the width of the traces STa/STb in FIG. 13B is narrow (e.g. the copper wire formed by etching the copper foil substrate). In contrast, the width of the traces STa/STb in FIG. 13A are wider (e.g. it is made by printing a metal paste with lower conductivity than the etched copper wire). Both have no direct impact on the electrical connection between the pad FP and the light emitting unit LED.

Figure 13C:
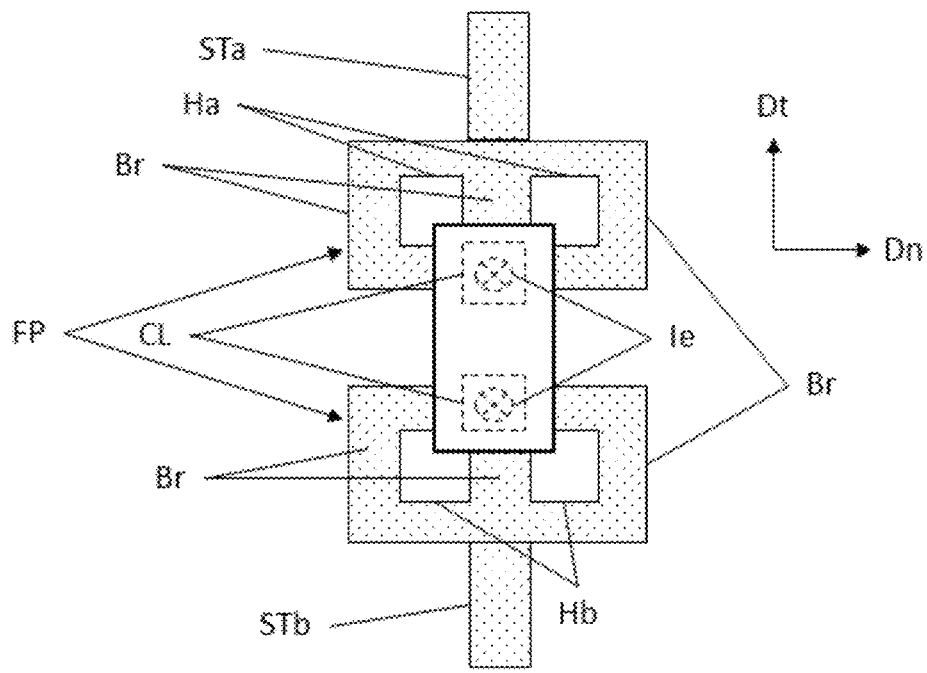

As shown in FIG. 13C, each of the two pads FP has three branches Br, and the arrangement is also similar to that in FIGS. 12A and 12B. The branch Br in the middle extends straight outward from the intersection point IE to connect the sub-traces STa/STb, and the remaining left and right two branches Br extend outward from the intersection point IE in a U-shaped path to connect the sub-traces STa/STb. The width of the trace STa/STb in FIG. 13C is narrow and the width of the trace STa/STb in FIGS. 12A and 12B is wide in comparison. However, as mentioned in the above, the width of the traces STa/STb has little effect on the electrical connection between the pad FP and the light emitting unit LED.

Figure 13D:
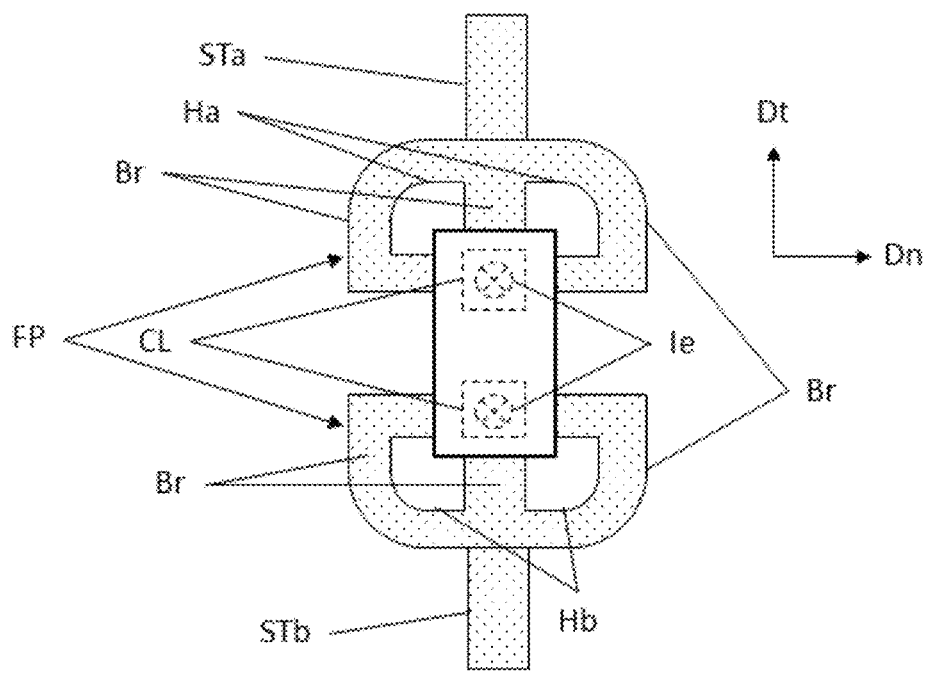
Figure 13E:
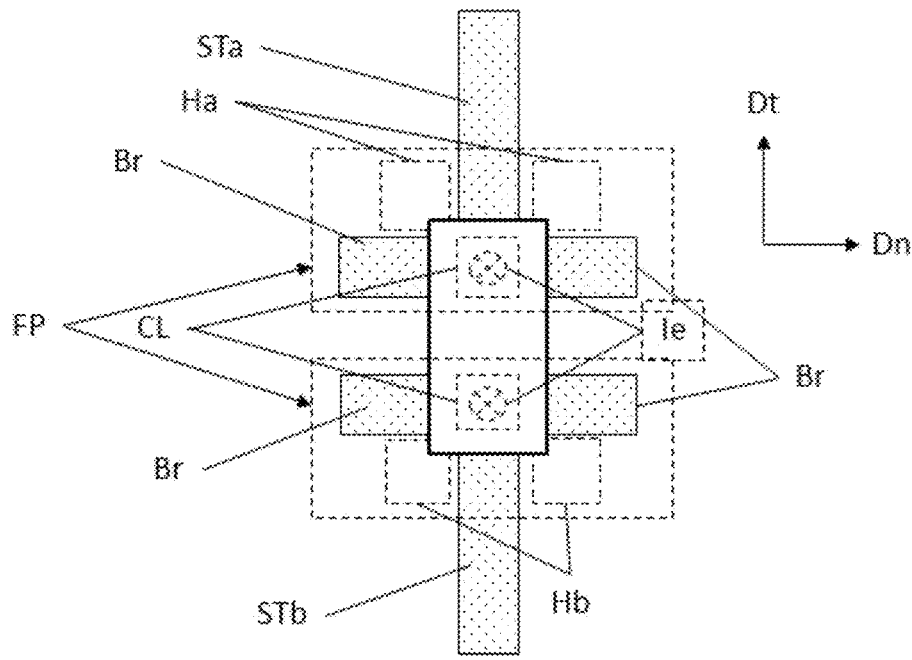

As shown in FIG. 13D, each of the two pads FP has three branches Br, and the arrangement is also similar to that in FIG. 13C. In FIG. 13D, the branch Br in the middle extends straight outward from the intersection point IE to connect the sub-traces STa/STb, and the remaining left and right two branches Br extend outward from the intersection point IE in a U-shaped path to connect the sub-traces STa/STb. The difference is in the shape of the pad FP. The shape of the pad FP in FIG. 13D is closer to a semicircle, that is, both the left and right branches Br in FIG. 13D have arc-shaped chamfers, which is more corresponding to the aforesaid FIG. 3 or more circular arcs of the light guide hole L0 in subsequent FIGS. 14A to 14D. In this way, it may better match and increase the amount of light entering the side of the light guide plate LGP. Although each pad FP in FIG. 13E has a branch Br extending outward from the intersection point IE to form a flat side, but only the middle branch Br is connected to the sub-trace STa/STb. The left and right branches Br extend to form a straight path outward from the intersection point IE toward the normal direction Dn, and neither extend to the sub-trace STa/STb nor connect the trace STa/STb. However, the middle branch Br along with the left and right branches Br still define the hollow area Ha/Hb, such that the light emitting unit LED at least partially overlaps with one of the hollow areas Ha/Hb.

Figure 13F:
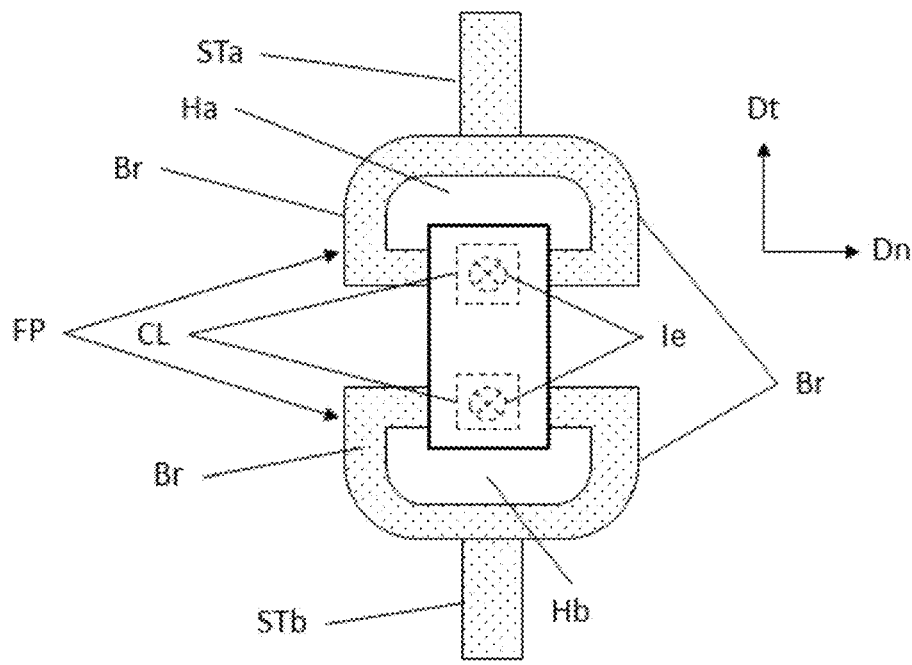

The pad FP in FIG. 13F is similar to the pad FP in FIG. 13D, but the middle branch line Br is omitted. Only the left and right branches Br extend outward from the intersection point IE in a U-shaped path to connect the sub-traces STa/STb. The two pads FP and the branches Br thereof in FIG. 13F also form a pair of flat sides parallel to each other. Each of the two pads FP has only one hollow area Ha/Hb, such that (two short sides of) the light emitting unit LED at least partially overlaps with at least one of the hollow areas Ha/Hb. The two short sides of the light emitting unit LED in FIG. 13F cross the hollow area Ha/Hb respectively, which is also similar to the triangular pad FP in FIGS. 13A and 13B, but the pad FP and the hollow area Ha/Hb in FIG. 13F are larger than those in FIGS. 13A and 13B. Furthermore, in FIGS. 13A to 13F, each pair of pads FP is connected to the light emitting unit LED in an end-to-end structure, but in practice, based on the descriptions of the aforesaid embodiments, the different types of pads FP in FIGS. 13A to 13F of the invention may all be applied to the side-to-side lateral connection structure similar to FIG. 12C.

In addition, the area around the low power light emitting unit is the area with the highest brightness. Expanding the light reflection angle in this area is the key to increase the amount of light entering the side of the light guide plate, increase the ratio of lateral transmission, and improve the uniformity of light emission. However, the area around the light emitting unit is the physical connection area between the light emitting unit LED and the lighting board LCB. How to make the light emitting unit LED be electrically connected to the lighting board LCB and expand the light reflection angle at the same time is a significant issue in the design of the electrical connection structure of the light emitting unit LED.

Figure 14A:
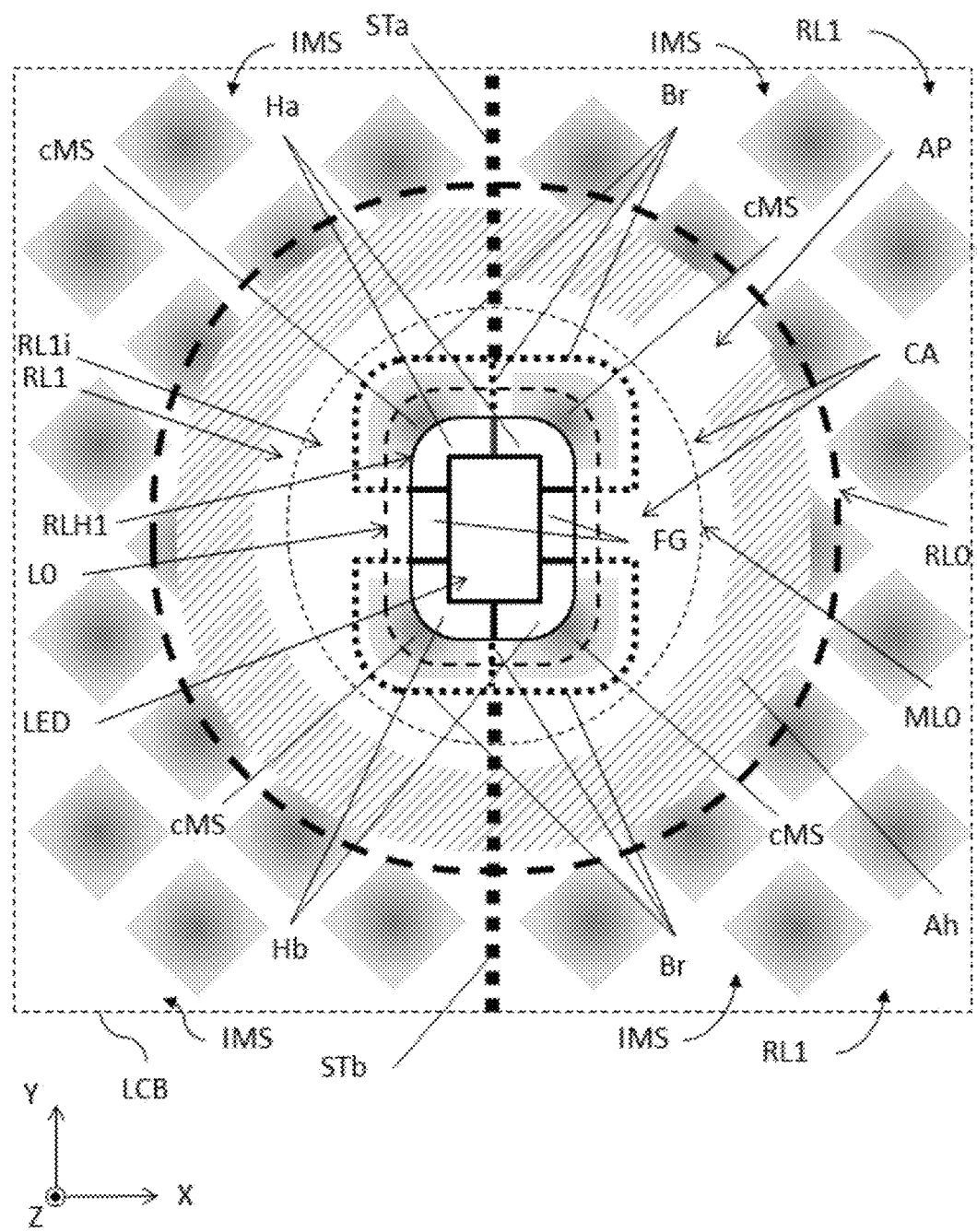
FIG. 14A is a partial top view illustrating optical structure of the backlight module around the light emitting unit according to another embodiment of the invention.
Figure 14B:
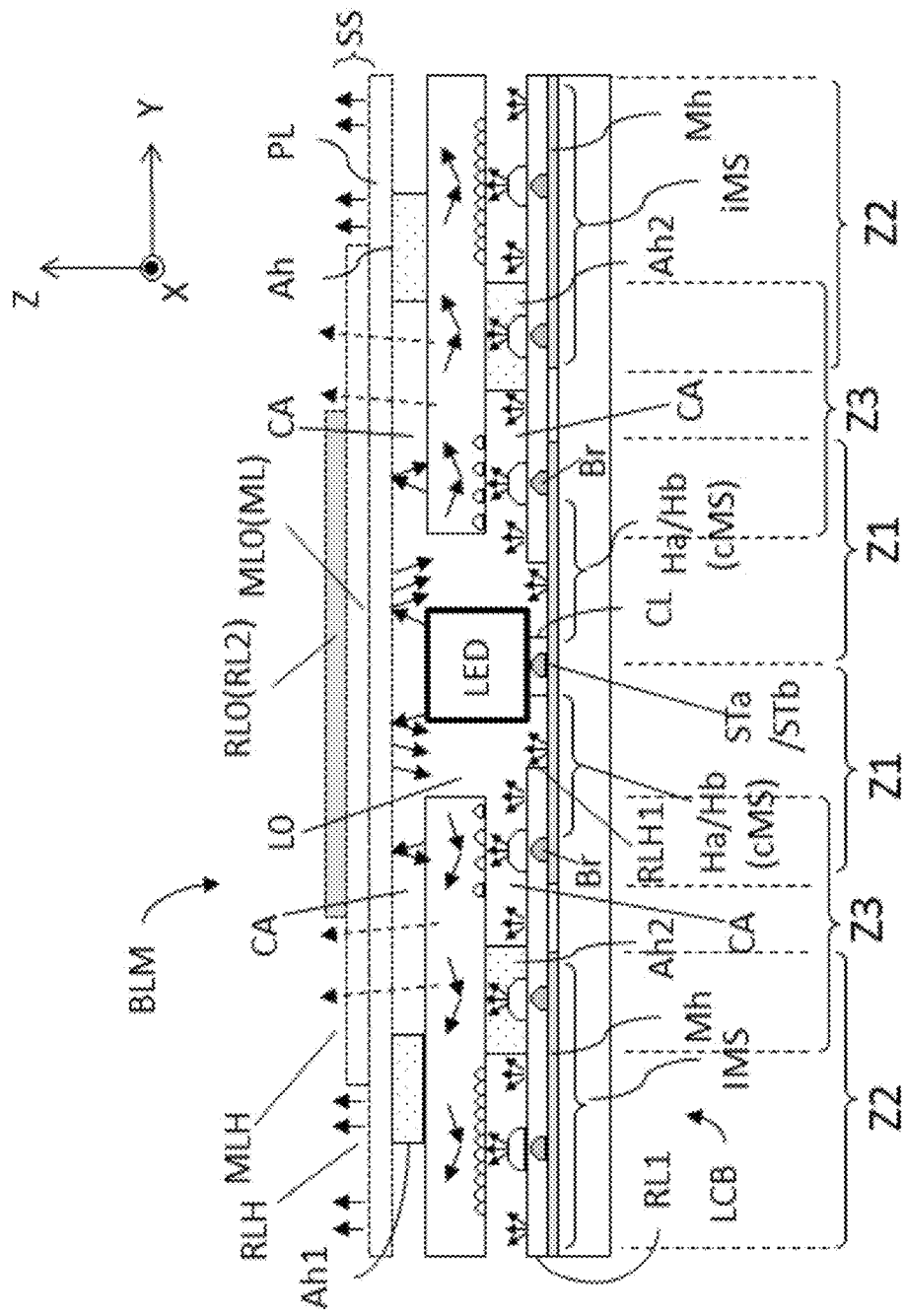
FIG. 14B is a partial sectional view illustrating the backlight module of the embodiment shown in FIG. 14A.
Figure 14C:
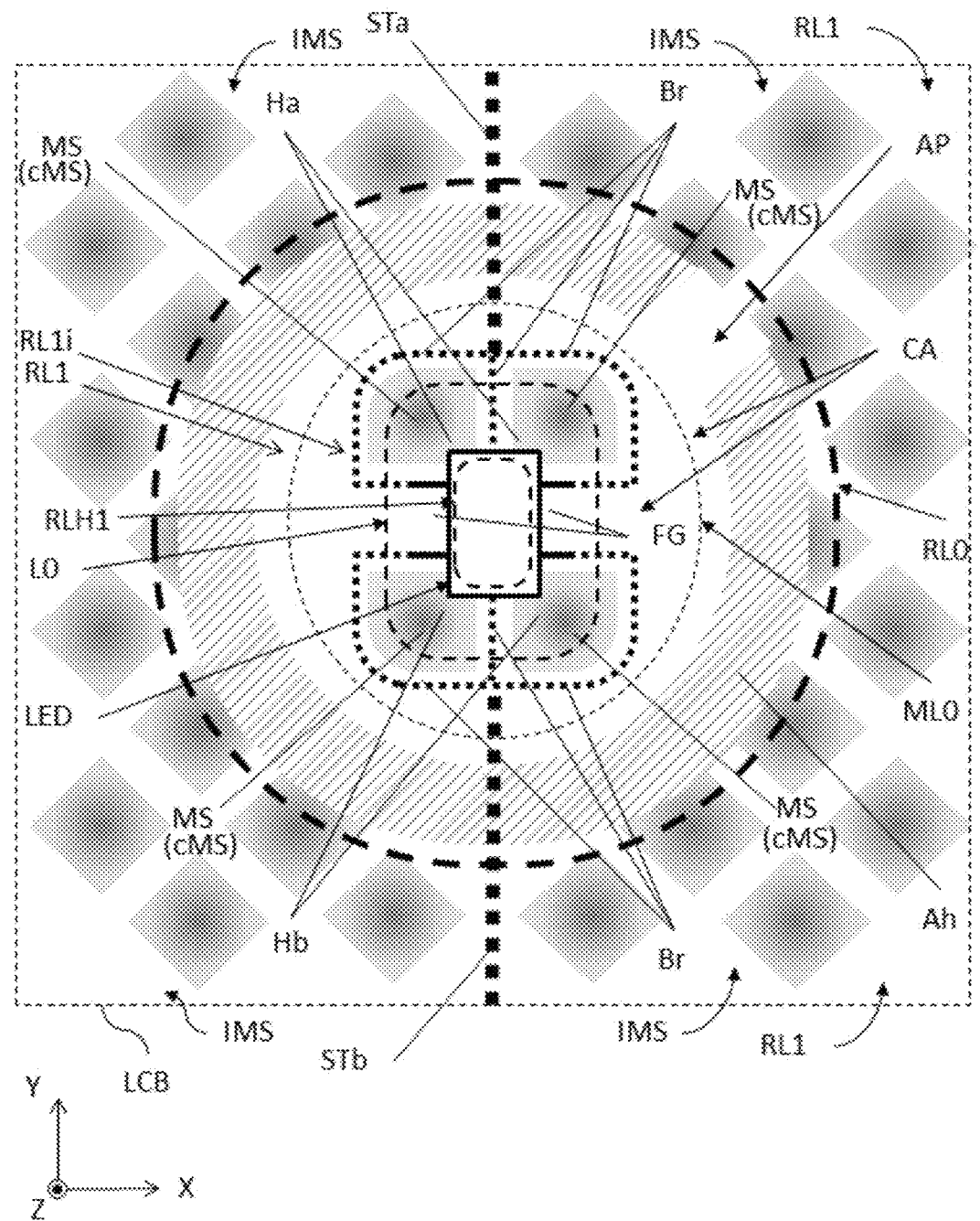
FIG. 14C is a partial top view illustrating optical structure of the backlight module around the light emitting unit according to another embodiment of the invention.
Figure 14D:
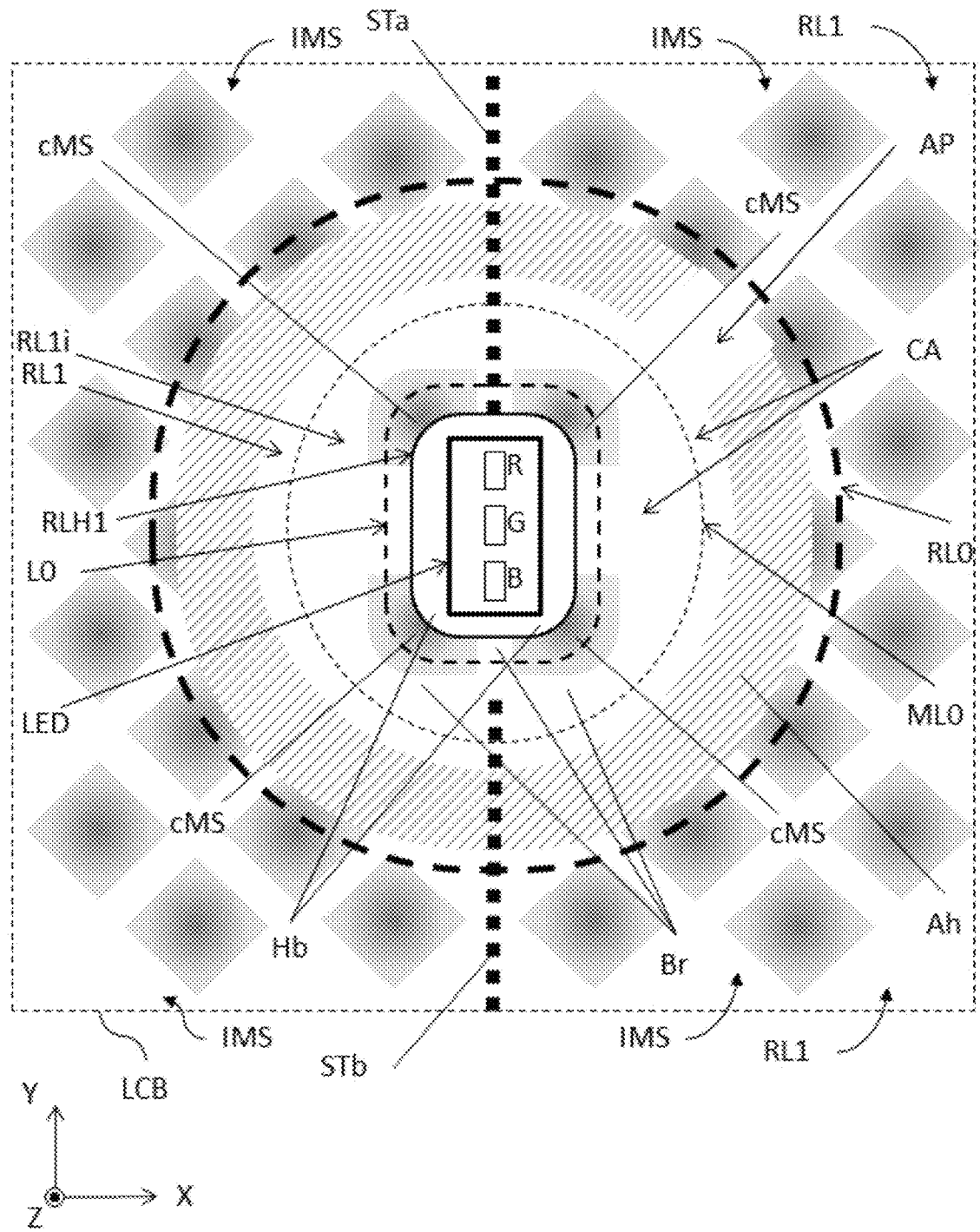
FIG. 14D is a partial top view illustrating optical structure of the backlight module according to a derivative embodiment of FIG. 14A of the invention.

Referring to FIGS. 14A, 14B and 14C, FIG. 14A is a partial top view illustrating optical structure of the backlight module around the light emitting unit according to another embodiment of the invention. FIG. 14B is a partial sectional view illustrating the backlight module of the embodiment shown in FIG. 14A. FIG. 14C is a partial top view illustrating optical structure of the backlight module around the light emitting unit according to another embodiment of the invention. FIG. 14D is a partial top view illustrating optical structure of the backlight module according to a derivative embodiment of FIG. 14A of the invention.

As shown in FIGS. 14A and 14B, the height difference between six branches Br and four hollow areas Ha/Hb of the two pads FP generates a concave-convex structure covered by the first reflective layer RL1, such that the entire area of each pad FP may form a core micro-structure region cMS surrounding at least one part of the light emitting unit LED, wherein both the concave region (hollow area Ha/Hb) and the convex region (branch Br) may play the role of the micro-structure region MS respectively. These pads FP and the core micro-structure region cMS are located under the inner reflective section RL0 of the shielding sheet SS. Even if there are no special pad FP and its hollow area Ha/Hb and branch Br, as long as the first reflective layer RL1 covered around the light emitting unit LED has the aforesaid concave-convex structure, the core micro-structure region cMS may still be formed around the light emitting unit LED. Thus, one or more core micro-structure regions cMS surrounding the light emitting unit LED may further reflect and diffuse the light reflected downward by the inner reflective section RL0 of the shielding plate SS, and increase the amount of light entering the side of the light guide hole L0, so as to improve the lateral transmission ratio and enhance the overall luminous uniformity of the key KS and the lighting keyboard LKB.

From the perspective of the overall structure, with the light emitting unit LED as the center, the backlight module BLM of the embodiment of the invention provides a plurality of light uniform areas to achieve a uniform light emission effect. The plurality of light uniform areas of the backlight module BLM at least comprises a first area Z1 and a second area Z2. The first area Z1 surrounds the light emitting unit LED. The first area Z1 comprises an inner ring section RL1*i* of the first reflective layer RL1 and a pair of pads FP. The pair of pads FP are located on the lighting board LCB and configured to connect the light emitting unit LED. The inner ring section RL1$i$ of the first reflective layer RL1 at least partially covers the pair of pads FP, such that the inner ring section RL1$i$ of the first reflective layer RL1 reflects and diffuses light of the light emitting unit LED. The second area Z2 surrounds the first area Z1. The second area Z2 comprises a pair of micro-structure regions MS apart from each other and located on the first reflective layer RL1. The pair of micro-structure regions MS jointly surround the pair of pads FP. The pair of micro-structure regions MS reflect and diffuse light of the lighting emitting unit LED transmitted through the first area Z1.

The first area Z1 closest to the light emitting unit LED provides one or more core micro-structure regions cMS around the light emitting unit LED through the two pads FP on the lighting board LCB and the first reflective layer RL1. The combination of the branch Br and the hollow area Ha/Hb makes the first area Z1 have a concave-convex structure. Since the pad FP and the core micro-structure region cMS thereof at least partially overlap with the inner reflective section RL0 of the shielding sheet SS in the Z direction, they can be used to reflect, diffuse and open the angle of light from the inner reflective section RL0 and make the light incident toward the side of the light guide hole L0. In the first area Z1, the reflective layer hole RLH1 may overlap with the two pads FP and the hollow area Ha/Hb thereof, the branch Br and the core micro-structure region cMS, and the light guide hole L0 may also overlap with the two pads FP and the hollow area Ha/Hb thereof, the branch Br and the core micro-structure region cMS.

Secondly, the second area Z2 surrounds the light emitting unit LED at a further distance, and also surrounds the light guide hole L0 and the reflection layer hole RLH1. The second area Z2 comprises two inner micro-structure regions IMS separated by a pair of non-intersecting sub-traces STa/STb on the lighting board LCB (also refer to the aforesaid embodiments shown in FIGS. 3, 10 and 11). The two inner micro-structure regions IMS are located on the upper surface of the first reflective layer RL1, which jointly surround at least one part of the first area Z1. Although the two inner micro-structure regions IMS may only partially overlap with the inner reflection section RL0 of the shading sheet SS, less light directly coming from the inner reflection section RL0 reach the inner micro-structure regions IMS. However, during the lateral transmission in the light guide plate LGP, the light with an angle smaller than the critical angle cannot continue to be fully reflected inside the light guide plate LGP and pass through the lower surface of the light guide plate LGP. The emitted light may be recycled by the two inner micro-structure regions IMS and then enter the light guide plate LGP to continue to be transmitted laterally through reflection and diffusion.

In addition, the backlight module BLM may set a third area Z3 between the first area Z1 and the second area Z2. The third area Z3 may overlap with the first area Z1 and/or the second area Z2 in the Z direction. The third area Z3 mainly comprises an adhesive layer Ah (e.g. the adhesive layer Ah1 and/or Ah2 in FIG. 14B) disposed above the lighting board LCB in FIG. 14A. Although there is a need to use glue for positioning between the layers of the backlight module BLM, the glue should also be taken into consideration in optical design. First, the adhesive layer Ah1/Ah2 may be an adhesive material capable of transmitting light and has a good optical coupling effect. While excessive concentration of light around the light emitting unit LED is an original problem with low light emitting unit, it is also possible to overkill in the implementation, for example, resulting in the inner outlet KC0 closer to the center of the key cap KC in FIG. 3 has insufficient light. At this time, the adhesive layer Ah1/Ah2 may be used to fine-tune and increase the light intensity, as a means of post-correction. For further explanation, the adhesive layer Ah1 may surround the light guide hole L0, the reflective layer hole RLH1 and the light emitting unit LED and is disposed on the upper surface of the light guide plate LGP (i.e. between the light guide plate LGP and the shielding sheet SS), and the adhesive layer Ah2 may surround the light guide hole L0, the reflective layer hole RLH1 and the light emitting unit LED and is disposed on the lower surface of the light guide plate LGP (i.e. between the light guide plate LGP and the lighting board LCB).

The adhesive layer Ah/Ah1/Ah2 is not suitable for being too close to the light emitting unit LED, because the optical coupling effect of the adhesive layer Ah/Ah1/Ah2 will make the light emitted by the light emitting unit LED too concentrated and cannot be diffused. If the adhesive layer Ah/Ah1/Ah2 is in contact with the light emitting unit LED during the manufacturing process, its viscosity may cause the light emitting unit LED to peel off. Therefore, the adhesive layer Ah/Ah1/Ah2 must be applied under proper control, including setting the non-adhesive area CA or reducing the width of the adhesive layer. The non-adhesive area CA may be disposed between the adhesive layer Ah/Ah1/Ah2 and the light guide hole L0, or between the adhesive layer Ah/Ah1/Ah2 and the reflective layer hole RLH1. In the Z direction, the non-adhesive area CA may be disposed on the upper surface of the light guide plate LGP (i.e. between the light guide plate LGP and the shielding sheet SS), and the non-adhesive area CA may also be disposed on the lower surface of the light guide plate LGP (i.e. between the light guide plate LGP and the lighting board LCB). In practice, the adhesive layer Ah1/Ah2 may be disposed either one or at the same time. An adhesive gap AP is another adjusting manner for applying the adhesive layer Ah1/Ah2. If there is a need to increase the outline halo of the key cap KC or the brightness of the outer characters (outer outlet KC1) in a specific direction, the adhesive gap AP may be formed on the adhesive layer Ah1/Ah2 to correspond to the required position or outlet. The adhesive gap AP may allow more light to continue to transmit outward laterally and smoothly, thereby improving the brightness of the light in this direction.

On the whole, the first area, the second area, and the third area respectively cover different blocks and different areas of the light emitting unit LED in the 360-degree range from the Z direction. Due to the different arrangements of the optical components, the amount of light emitted upward from the first area/second area/third area may be relatively similar. In addition, there are other components that may be used as the adjusting manner. For example, the micro-structure region MS on the surface of the light guide plate LGP may be used in conjunction with the core micro-structure region cMS, the inner micro-structure region IMS and the outer micro-structure region OMS of the first reflective layer RL1 of the lighting board LCB to increase effects of reflection and diffusion. Furthermore, using the inner reflective section RL0 of the shielding sheet SS to cover the adhesive layer Ah1/Ah2 may also reduce light loss caused by the adhesive layer Ah1/Ah2 and recycle light.

In the Z direction, as shown in FIGS. 14A and 14B, the light guide hole L0 is larger than the reflective layer hole RLH1 of the first reflective layer RL1, and the reflective layer hole RLH1 is larger than the light emitting unit LED.

That is to say, the wall of the reflective layer hole RLH1 surrounds the light emitting unit LED and does not completely cover the two pads FP. In other words, the reflective layer hole RLH1 is located between the light emitting unit LED and the light guide hole L0, and a part (the innermost ring area) of the first reflective layer RL1 is located between the reflective layer hole RLH1 and the light guide hole L0. In this way, the two pads FP are at least partially exposed in the reflective layer hole RLH1. The exposed range of the pad FP directly affects the range in which the light emitting unit LED can be well connected when the offset occurs. Therefore, the more the pad FP is exposed, the better connection between the light emitting unit LED and the pad FP can be ensured. At the same time, the exposed pad FP means that there is no reflection provided by the first reflective layer RL1, but this does not mean that the area in the reflective layer hole RLH1 cannot provide effects of reflection and diffusion. First, since the pad FP is copper or copper alloy (or other alternative metals), the reflective layer hole RLH1 may provide effects of reflection and diffusion in the light guide hole L0 by the exposed branch Br of the two pads FP (located between the light emitting unit LED and the reflective layer hole RLH1). Secondly, the hollow area of the exposed area of the two pads FP (including the hollow area Ha/Hb and the pad gap FG) is usually the substrate of the exposed lighting board LCB (located below the circuit and the pad FP). As long as the exposed upper surface of the substrate can reflect light, no matter whether the upper surface of the substrate itself is reflective, or there is a metal solder/conductive layer, or there is glue that ensures the fixation of the light emitting unit LED, it can also provide effects of reflection and diffusion.

Referring to FIG. 14C, when the mass production yield has stabilized, and the mounting accuracy, mounting temperature, conductive layer flow, and mounting offset of the light emitting unit LED are well controlled, a smaller reflective layer hole RLH1 may be used. When the reflective layer hole RLH1 is small and even when four sides of the light emitting unit LED is surrounded by the wall of the reflective layer hole RLH1, the first reflective layer RL1 may cover almost the entire area of the lighting board LCB within the range of the light guide hole L0, thereby preventing any part of the pad FP from being exposed. At this time, the completely covered two pads FP, the branch Br and the plurality of hollow areas Ha/Hb may form a plurality of micro-structures with complete shape and larger area, so as to form the core micro-structure region cMS surrounding the light emitting unit LED. If the area of the core micro-structure region cMS is large, much light may be diffused in the early stage, such that much light can smoothly enter the side wall of the light guide hole L0. The core micro-structure region cMS may be partially located within the range of the light guide hole L0 and partially located outside the wall of the light guide hole L0. Needless to say, if the size and shape of the reflective layer hole RLH1 is similar to that of the light emitting unit LED or slightly larger than the light emitting unit LED, a similar effect may also be achieved.

Based on the arrangements of the aforesaid embodiments, in FIGS. 14A to 14C, a part of the branches Br of the two pads FP jointly surround at least one part of the light guide hole L0. The hollow areas Ha/Hb of the two pads FP jointly surround and/or overlap with the reflective layer hole RLH1. Apart of the inner ring section RL1i of the first reflective layer RL1 between the reflective layer hole RLH0 and the light guide hole L0 overlaps with at least one part of the two pads FP, such that a part of the first reflective layer RL1 exposed in the light guide hole L0 together with a part of the pad FP may form a concave-convex reflection/diffusion structure, such as the core micro-structure region cMS. Finally, although each pad FP in each embodiment of the invention is connected to the sub-traces STa/STb for example, but, in practical applications, each pad FP may also be selectively and directly connected to the main traces HT/LT mentioned in the aforesaid embodiments and FIGS. 2 to 11 as required.

Referring to FIG. 14D, the light emitting unit LED encapsulates three-color dies to provide three-color light (e.g. red, green and blue). In order to achieve a good light mixing effect for the three-color dies of the light emitting unit LED, the core micro-structure region cMS surrounding the light emitting unit LED is also formed on the inner ring section RL1i of the first reflective layer RL1 (no matter whether there is the aforesaid pad FP or what the type of the pad FP is), so as to increase the light mixing effect of the three-color dies of the light emitting unit LED by improving the effects of reflection and diffusion. In addition, the arrangement of the three-color dies may be arranged continuously from long side to long side. The advantage is that the light emitting unit LED is shorter and the offset of the mounting process is less likely to interfere with the small-sized light guide hole L0, but the disadvantage is that the light mixing effect is poor. Since the long side of the die with a large light output is blocked by the long side of the adjacent die, it is difficult for different color lights to be transmitted interlacedly. Another manner is shown in FIG. 14D. The long side of each of the three-color dies is parallel to the long side of the light emitting unit LED. That is to say, the long side of each of the three-color dies is arranged along the Y direction, or the three-color dies are arranged consecutively from short side to short side. In this way, the long sides of the dies with a large amount of light output and a large light output range are facing the X direction in the figure, overlapping and staggering with each other, and a better light mixing effect may be obtained in two larger fan-shaped ranges in the X direction. At the same time, in the Y direction, because the short sides of the dies are adjacent to each other, the short sides of the dies emit less light and the range of light output is small, the light blocked by the short sides of the dies is also less, and the problem of polarization is also less.

As mentioned in the above, the embodiments of the invention shown in FIGS. 12A to 14C simultaneously solve the problem of connection stability of the light emitting unit and the problem of excessive concentration of light emitted from adjacent areas of the light emitting unit. In addition to using the pads with the hollow areas to ensure that the light emitting unit can still be connected well when the light emitting unit is offset during mounting process, the pads and the hollow areas thereof are further used together with the first reflective layer to form a light uniform design in the first area. Furthermore, combined with the inner micro-structure regions of the lighting board in the second area and the adhesive layer and the non-adhesive area in the third area, the invention provides different light uniform schemes for different blocks along the outward optical path of the light emitting unit, such that a high degree of uniformity can be achieved for the character brightness and key cap halo of a single key and even the entire keyboard.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module configured to illuminate at least one key cap, the backlight module comprising:
    a lighting board, having a first reflective layer, a lighting circuit and a plurality of conductive pads layered at least partially in parallel to each other;
    a light emitting unit, including a plurality of color dies connecting electrically with the lighting circuit through the plurality of pads;
    a light guide plate as a light-permeable spacer, having a light guide hole for accommodating the light emitting unit; and
    wherein at least one of the first reflective layer, the lighting circuit and the plurality of conductive pads are partially exposed within the light guide hole to reflect different color lights directly or indirectly from the plurality of color dies to enter the light guide plate for lateral transmission and color-mixing;
    wherein a light-permeable adhesive layer is disposed outside the light guide hole, and is further spaced outwards by a non-adhesive clearance area circling between the light guide hole and the adhesive layer.

2. The backlight module of claim 1, wherein the lighting board further comprises a plurality of micro-structure regions separated by the lighting circuit, and the non-adhesive clearance area and the adhesive layer are jointly surrounded by the plurality of micro-structure regions.

3. The backlight module of claim 1, wherein the lighting circuit has a pair of non-intersecting traces, and the color dies of the light emitting unit are linearly aligned perpendicular to the pair of non-intersecting traces.

4. The backlight module of claim 1, wherein each of the color dies of the light emitting unit comprises two opposite short sides, and all the color dies are consecutively aligned with any adjacent two of said short sides being arranged one facing another.

5. The backlight module of claim 1, wherein the backlight module comprises a shielding sheet, and the shielding sheet comprises an inner reflective section overlapping with at least one of the first reflective layer, the lighting circuit and the plurality of conductive pads partially exposed within the light guide hole.

6. The backlight module of claim 1, wherein a protrusion structure is formed on the lighting board and corresponds to the light emitting unit.

7. The backlight module of claim 1 further comprising a shielding sheet disposed above the light emitting unit, wherein a protrusion structure is formed on the shielding sheet and corresponds to the light emitting unit.

8. A backlight module configured to illuminate at least one key cap, the backlight module comprising:
    a lighting board, having a first reflective layer, a lighting circuit and two aligned micro-structure regions at least partially layered in parallel with each other, the two micro-structure regions being separated by the lighting circuit;
    a light emitting unit, including a plurality of color dies connecting electrically with the lighting circuit; and
    a light guide plate, having a light guide hole for accommodating the light emitting unit;
    wherein the color dies of the light emitting unit are aligned linearly, and the two micro-structure regions of the lighting board are aligned in perpendicular to the linearly-aligned color dies, with the micro-structure regions disposed at opposite sides of the light emitting unit.

9. The backlight module of claim 8, wherein the lighting circuit has two non-intersecting sub-traces electrically connected to the light emitting unit, and the two sub-traces separates the two micro-structure regions.

10. The backlight module of claim 9, wherein the lighting circuit has two non-intersecting main traces electrically connected to the light emitting unit through the two sub-traces, and two inner micro-structure regions of the two micro-structure regions are disposed between the two main traces.

11. The backlight module of claim 8, wherein the lighting circuit has two non-intersecting main traces electrically connected to the light emitting unit, and the two micro-structure regions are disposed outside the two main traces.

12. The backlight module of claim 8, wherein a protrusion structure is formed on the lighting board and corresponds to the light emitting unit.

13. The backlight module of claim 8 further comprising a shielding sheet disposed above the light emitting unit, wherein a protrusion structure is formed on the shielding sheet and corresponds to the light emitting unit.

14. The backlight module of claim 8, wherein each of the color dies of the light emitting unit comprises two opposite short sides, and all the color dies are consecutively aligned with any adjacent two of said short sides being arranged one facing another.

15. A lighting board configured to illuminate at least one key cap, the lighting board comprising:
    a lighting circuit, at least partially reflective, the lighting circuit including at least two non-intersecting traces and a plurality of conductive pads;
    at least two micro-structure regions, separated from each other by the lighting circuit, each of the at least two micro-structure regions reflecting lights; and
    a light emitting unit located between the two micro-structure regions, the light emitting unit including a plurality of color dies providing different color lights and electrically connecting with the two non-intersecting traces through the plurality of pads;
    wherein the color dies of the light emitting unit are aligned linearly, and the two micro-structure regions are aligned in perpendicular to the linearly-aligned color dies, with the micro-structure regions disposed at opposite sides of the light emitting unit.

16. The lighting board of claim 15 further comprising a protrusion formed corresponding to the light emitting unit.

17. The lighting board of claim 15, wherein the lighting circuit has two non-intersecting sub-traces electrically connected to the light emitting unit, and the two sub-traces separates two inner micro-structure regions of the at least two micro-structure regions.

18. The lighting board of claim 17, wherein the lighting circuit has two non-intersecting main traces electrically connected to the light emitting unit through the two sub-traces, and the two inner micro-structure regions of the at least two micro-structure regions are disposed between the two main traces.

19. The lighting board of claim 15, wherein the lighting circuit has two non-intersecting main traces electrically connected to the light emitting unit, and two outer micro-structure regions of the at least two micro-structure regions are disposed outside the two main traces.

20. The lighting board of claim 15, wherein each of the color dies of the light emitting unit comprises two opposite short sides, and all the color dies are consecutively aligned with any adjacent two of all said short sides being arranged one facing another.

\* \* \* \* \*

UNITED STATES PATENT AND TRADEMARK OFFICE
CERTIFICATE OF CORRECTION

PATENT NO. : 12,198,877 B2  
APPLICATION NO. : 18/512073  
DATED : January 14, 2025  
INVENTOR(S) : Heng-Yi Huang et al.

Page 1 of 1

It is certified that error appears in the above-identified patent and that said Letters Patent is hereby corrected as shown below:

On the Title Page

On the second page, item (30), correct the TW priority application number from "122110265" to --112110265--.

Signed and Sealed this  
Eighteenth Day of February, 2025

Coke Morgan Stewart  
*Acting Director of the United States Patent and Trademark Office*